(12) United States Patent
Sivaramakrishnan et al.

(10) Patent No.: US 12,267,256 B1
(45) Date of Patent: Apr. 1, 2025

(54) DYNAMIC DESTINATION ID IN AN ARRAY LEVEL NETWORK OF A RECONFIGURABLE DATAFLOW PROCESSOR

(71) Applicant: SambaNova Systems, Inc., Palo Alto, CA (US)

(72) Inventors: Ram Sivaramakrishnan, San Jose, CA (US); Mark Luttrell, Cedar Park, TX (US); Sumti Jairath, Santa Clara, CA (US); Raghu Prabhakar, San Jose, CA (US); Gregory Frederick Grohoski, Bee Cave, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 297 days.

(21) Appl. No.: 17/894,134

(22) Filed: Aug. 23, 2022

Related U.S. Application Data

(60) Provisional application No. 63/236,218, filed on Aug. 23, 2021.

(51) Int. Cl.
*H04L 49/15* (2022.01)

(52) U.S. Cl.
CPC .................................. *H04L 49/15* (2013.01)

(58) Field of Classification Search
CPC ....................................................... H04L 49/15
See application file for complete search history.

(56) References Cited

U.S. PATENT DOCUMENTS

2020/0241844 A1* 7/2020 Koeplinger ............... G06F 5/08

* cited by examiner

*Primary Examiner* — Soe Hlaing
(74) *Attorney, Agent, or Firm* — Flagship Patents; Sikander M. Khan; Bruce A. Young

(57) ABSTRACT

A tile of an embodiment of a coarse-grain reconfigurable architecture (CGRA) is based on an array of fused compute-memory units (FCMUs), pattern memory units (PMUs), and/or pattern compute units (PCUs) arranged in two dimensions, M×N. Unless clearly noted from context, any reference to a FCMU, PCU, or PMU may refer to one or more of the other units. The communication between a set of FCMUs is performed over a (M+1)×(N+1) switch fabric called the array-level network (ALN) where each switch has connections to its neighboring FCMUs and to neighboring switches in each of the four directions.

18 Claims, 10 Drawing Sheets

DYNAMIC DESTINATION ID IN AN ARRAY LEVEL NETWORK OF A RECONFIGURABLE DATAFLOW PROCESSOR

CROSS-REFERENCE TO RELATED APPLICATIONS

This application claims the benefit under 35 U.S.C. § 119 to U.S. Provisional Application 63/236,218 filed Aug. 23, 2021, entitled "Switch for a Reconfigurable Dataflow Processor," which is incorporated by reference herein for any and all purposes.

RELATED APPLICATION(S) AND DOCUMENTS

This application is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239,252, filed Jan. 3, 2019, entitled "VIRTUALIZATION OF A RECONFIGURABLE DATA PROCESSOR,";

U.S. Nonprovisional patent application Ser. No. 16/862,445, filed Apr. 29, 2020, entitled "VIRTUALIZATION OF A RECONFIGURABLE DATA PROCESSOR,";

U.S. Nonprovisional patent application Ser. No. 16/197,826, filed Nov. 21, 2018, entitled "CONFIGURATION LOAD OF A RECONFIGURABLE DATA PROCESSOR,";

U.S. Nonprovisional patent application Ser. No. 16/198,086, filed Nov. 21, 2018, entitled "CONFIGURATION UNLOAD OF A RECONFIGURABLE DATA PROCESSOR,";

U.S. Nonprovisional patent application Ser. No. 17/093,543, filed Nov. 9, 2020, entitled "EFFICIENT CONFIGURATION OF A RECONFIGURABLE DATA PROCESSOR,";

U.S. Nonprovisional patent application Ser. No. 16/260,548, filed Jan. 29, 2019, entitled "MATRIX NORMAL/TRANSPOSE READ AND A RECONFIGURABLE DATA PROCESSOR INCLUDING SAME,";

U.S. Nonprovisional patent application Ser. No. 16/536,192, filed Aug. 8, 2019, entitled "COMPILER FLOW LOGIC FOR RECONFIGURABLE ARCHITECTURES,";

U.S. Nonprovisional patent application Ser. No. 17/326,128, filed May 20, 2021, entitled "COMPILER FLOW LOGIC FOR RECONFIGURABLE ARCHITECTURES,";

U.S. Nonprovisional patent application Ser. No. 16/407,675, filed May 9, 2019, entitled "CONTROL FLOW BARRIER AND RECONFIGURABLE DATA PROCESSOR,";

U.S. Nonprovisional patent application Ser. No. 16/504,627, filed Jul. 8, 2019, entitled "QUIESCE RECONFIGURABLE DATA PROCESSOR,";

U.S. Nonprovisional patent application Ser. No. 17/322,697, filed May 17, 2021, entitled "QUIESCE RECONFIGURABLE DATA PROCESSOR,";

U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION,";

U.S. Nonprovisional patent application Ser. No. 16/744,077, filed Jan. 15, 2020, entitled "COMPUTATIONALLY EFFICIENT SOFTMAX LOSS GRADIENT BACKPROPAGATION,";

U.S. Nonprovisional patent application Ser. No. 16/590,058, filed Oct. 1, 2019, entitled "COMPUTATION UNITS FOR FUNCTIONS BASED ON LOOKUP TABLES,";

U.S. Nonprovisional patent application Ser. No. 16/695,138, filed Nov. 25, 2019, entitled "COMPUTATIONAL UNITS FOR BATCH NORMALIZATION,";

U.S. Nonprovisional patent application Ser. No. 16/688,069, filed Nov. 19, 2019, entitled "LOOK-UP TABLE WITH INPUT OFFSETTING,";

U.S. Nonprovisional patent application Ser. No. 16/718,094, filed Dec. 17, 2019, entitled "COMPUTATIONAL UNITS FOR ELEMENT APPROXIMATION,";

U.S. Nonprovisional patent application Ser. No. 16/560,057, filed Sep. 4, 2019, entitled "SIGMOID FUNCTION IN HARDWARE AND A RECONFIGURABLE DATA PROCESSOR INCLUDING SAME,";

U.S. Nonprovisional patent application Ser. No. 16/572,527, filed Sep. 16, 2019, entitled ",";

U.S. Nonprovisional patent application Ser. No. 15/930,381, filed May 12, 2020, entitled "COMPUTATIONALLY EFFICIENT GENERAL MATRIX-MATRIX MULTIPLICATION (GEMM),";

U.S. Nonprovisional patent application Ser. No. 17/337,080, filed Jun. 2, 2021, entitled "MEMORY EFFICIENT DROPOUT,";

U.S. Nonprovisional patent application Ser. No. 17/337,126, filed Jun. 2, 2021, entitled "MEMORY EFFICIENT DROPOUT, WITH REORDERING OF DROPOUT MASK ELEMENTS,";

U.S. Nonprovisional patent application Ser. No. 16/890,841, filed Jun. 2, 2020, entitled "ANTI-CONGESTION FLOW CONTROL FOR RECONFIGURABLE PROCESSORS,";

U.S. Nonprovisional patent application Ser. No. 17/023,015, filed Sep. 16, 2020, entitled "COMPILE TIME LOGIC FOR DETECTING STREAMING COMPATIBLE AND BROADCAST COMPATIBLE DATA ACCESS PATTERNS,";

U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION,";

U.S. Nonprovisional patent application Ser. No. 17/175,289, filed Feb. 12, 2021, entitled "INSTRUMENTATION PROFILING FOR RECONFIGURABLE PROCESSORS,";

U.S. Nonprovisional patent application Ser. No. 17/371,049, filed Jul. 8, 2021, entitled "SYSTEMS AND METHODS FOR EDITING TOPOLOGY OF A RECONFIGURABLE DATA PROCESSOR,";

U.S. Nonprovisional patent application Ser. No. 16/922,975, filed Jul. 7, 2020, entitled "RUNTIME VIRTUALIZATION OF RECONFIGURABLE DATA FLOW RESOURCES,";

U.S. Nonprovisional patent application Ser. No. 16/996, 666, filed Aug. 18, 2020, entitled "RUNTIME PATCHING OF CONFIGURATION FILES,";

U.S. Nonprovisional patent application Ser. No. 17/214, 768, filed Mar. 26, 2021, entitled "RESOURCE ALLOCATION FOR RECONFIGURABLE PROCESSORS,";

U.S. Nonprovisional patent application Ser. No. 17/127, 818, filed Dec. 18, 2020, entitled "INTRA-NODE BUFFER-BASED STREAMING FOR RECONFIGURABLE PROCESSOR-AS-A-SERVICE (RPAAS),";

U.S. Nonprovisional patent application Ser. No. 17/127, 929, filed Dec. 18, 2020, entitled "INTER-NODE BUFFER-BASED STREAMING FOR RECONFIGURABLE PROCESSOR-AS-A-SERVICE (RPAAS),";

U.S. Nonprovisional patent application Ser. No. 17/185, 264, filed Feb. 25, 2021, entitled "TIME-MULTIPLEXED USE OF RECONFIGURABLE HARDWARE,";

U.S. Nonprovisional patent application Ser. No. 17/216, 647, filed Mar. 29, 2021, entitled "TENSOR PARTITIONING AND PARTITION ACCESS ORDER,";

U.S. Nonprovisional patent application Ser. No. 17/216, 650, filed Mar. 29, 2021, entitled "MULTI-HEADED MULTI-BUFFER FOR BUFFERING DATA FOR PROCESSING,";

U.S. Nonprovisional patent application Ser. No. 17/216, 657, filed Mar. 29, 2021, entitled "LOSSLESS TILING IN CONVOLUTION NETWORKS-PADDING BEFORE TILING, LOCATION-BASED TILING, AND ZEROING-OUT,";

U.S. Nonprovisional patent application Ser. No. 17/384, 515, filed Jul. 23, 2021, entitled "LOSSLESS TILING IN CONVOLUTION NETWORKS-MATERIALIZATION OF TENSORS.";

U.S. Nonprovisional patent application Ser. No. 17/216, 651, filed Mar. 29, 2021, entitled "LOSSLESS TILING IN CONVOLUTION NETWORKS-TILING CONFIGURATION,";

U.S. Nonprovisional patent application Ser. No. 17/216, 652, filed Mar. 29, 2021, entitled "LOSSLESS TILING IN CONVOLUTION NETWORKS-SECTION BOUNDARIES,";

U.S. Nonprovisional patent application Ser. No. 17/216, 654, filed Mar. 29, 2021, entitled "LOSSLESS TILING IN CONVOLUTION NETWORKS-READ-MODIFY-WRITE IN BACKWARD PASS,";

U.S. Nonprovisional patent application Ser. No. 17/216, 655, filed Mar. 29, 2021, entitled "LOSSLESS TILING IN CONVOLUTION NETWORKS-WEIGHT GRADIENT CALCULATION,";

U.S. Nonprovisional patent application Ser. No. 17/364, 110, filed Jun. 30, 2021, entitled "LOSSLESS TILING IN CONVOLUTION NETWORKS-TILING CONFIGURATION FOR A SEQUENCE OF SECTIONS OF A GRAPH,";

U.S. Nonprovisional patent application Ser. No. 17/364, 129, filed Jun. 30, 2021, entitled "LOSSLESS TILING IN CONVOLUTION NETWORKS-TILING CONFIGURATION BETWEEN TWO SECTIONS,";

"U.S. Nonprovisional patent application Ser. No. 17/364, 141, filed Jun. 30, 2021, entitled ""LOSSLESS TILING IN CONVOLUTION NETWORKS-PADDING AND RE-TILING AT SECTION BOUNDARIES,";

U.S. Nonprovisional patent application Ser. No. 17/384, 507, filed Jul. 23, 2021, entitled "LOSSLESS TILING IN CONVOLUTION NETWORKS-BACKWARD PASS,";

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP,";

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT,";

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT,";

U.S. Provisional Patent Application No. 63/190,749, filed May 19, 2021, entitled "FLOATING POINT MULTIPLY-ADD, ACCUMULATE UNIT WITH CARRY-SAVE ACCUMULATOR,";

U.S. Provisional Patent Application No. 63/174,460, filed Apr. 13, 2021, entitled "EXCEPTION PROCESSING IN CARRY-SAVE ACCUMULATION UNIT FOR MACHINE LEARNING,";

U.S. Nonprovisional patent application Ser. No. 17/397, 241, filed Aug. 9, 2021, entitled "FLOATING POINT MULTIPLY-ADD, ACCUMULATE UNIT WITH CARRY-SAVE ACCUMULATOR,";

U.S. Nonprovisional patent application Ser. No. 17/216, 509, filed Mar. 29, 2021, entitled "UNIVERSAL RAIL KIT.";

U.S. Nonprovisional patent application Ser. No. 17/379, 921, filed Jul. 19, 2021, entitled "DATAFLOW FUNCTION OFFLOAD TO RECONFIGURABLE PROCESSORS,";

U.S. Nonprovisional patent application Ser. No. 17/379, 924, filed Jul. 19, 2021, entitled "DATAFLOW ALL-REDUCE FOR RECONFIGURABLE PROCESSOR SYSTEMS,";

U.S. Nonprovisional patent application Ser. No. 17/378, 342, filed Jul. 16, 2021, entitled "DEFECT REPAIR FOR A RECONFIGURABLE DATA PROCESSOR,";

U.S. Nonprovisional patent application Ser. No. 17/378, 391, filed Jul. 16, 2021, entitled "DEFECT REPAIR CIRCUITS FOR A RECONFIGURABLE DATA PROCESSOR,";

U.S. Nonprovisional patent application Ser. No. 17/378, 399, filed Jul. 16, 2021, entitled "ROUTING CIRCUITS FOR DEFECT REPAIR FOR A RECONFIGURABLE DATA PROCESSOR,";

U.S. Provisional Patent Application No. 63/220,266, filed Jul. 9, 2021, entitled "LOGIC BIST AND FUNCTIONAL TEST FOR A CGRA,";

U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM,";

U.S. Nonprovisional patent application Ser. No. 17/338, 620, filed Jun. 3, 2021, entitled "VARIABLE-LENGTH CLOCK STRETCHER WITH CORRECTION FOR GLITCHES DUE TO FINITE DLL BANDWIDTH,";

U.S. Nonprovisional patent application Ser. No. 17/338, 625, filed Jun. 3, 2021, entitled "VARIABLE- LENGTH CLOCK STRETCHER WITH CORRECTION FOR GLITCHES DUE TO PHASE DETECTOR OFFSET.";

U.S. Nonprovisional patent application Ser. No. 17/338,626, filed Jun. 3, 2021, entitled "VARIABLE-LENGTH CLOCK STRETCHER WITH CORRECTION FOR DIGITAL DLL GLITCHES,";

U.S. Nonprovisional patent application Ser. No. 17/338,629, filed Jun. 3, 2021, entitled "VARIABLE-LENGTH CLOCK STRETCHER WITH PASSIVE MODE JITTER REDUCTION,";

U.S. Nonprovisional patent application Ser. No. 17/405,913, filed Aug. 18, 2021, entitled "VARIABLE-LENGTH CLOCK STRETCHER WITH COMBINER TIMING LOGIC,";

U.S. Provisional Patent Application No. 63/230,782, filed Aug. 8, 2021, entitled "LOW-LATENCY MASTER-SLAVE CLOCKED STORAGE ELEMENT.";

All of the related application(s) and documents listed above are hereby incorporated by reference herein for all purposes.

BACKGROUND

The present subject matter relates to switching of dataflows in an on-chip mesh computing architecture.

Reconfigurable processors, including field programmable gate arrays FPGAs, can be configured to implement a variety of functions more efficiently or faster than might be achieved using a general purpose processor executing a computer program. So called coarse-grain reconfigurable architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

With the rapid expansion of applications that can be characterized by dataflow processing, such as natural-language processing and recommendation engines, the performance and efficiency challenges of traditional, instruction set architectures have become apparent. First, the sizable, generation-to-generation performance gains for multicore processors have tapered off. As a result, developers can no longer depend on traditional performance improvements to power more complex and sophisticated applications. This holds true for both CPU fat-core and GPU thin-core architectures. A new approach is required to extract more useful work from current semiconductor technologies. Amplifying the gap between required and available computing is the explosion in the use of deep learning. According to a study by OpenAI, during the period between 2012 and 2020, the compute power used for notable artificial intelligence achievements has doubled every 3.4 months. It is common for GPUs to be used for training and CPUs to be used for inference in machine learning systems based on their different characteristics. Many real-life systems demonstrate continual and sometimes unpredictable change, which means predictive accuracy of models declines without frequent updates.

Finally, while the performance challenges are acute for machine learning, other workloads such as analytics, scientific applications and even SQL data processing all could benefit from dataflow processing. New approaches should be flexible enough to support broader workloads and facilitate the convergence of machine learning and high-performance computing or machine learning and business applications.

DETAILED DESCRIPTION

Figure 1:
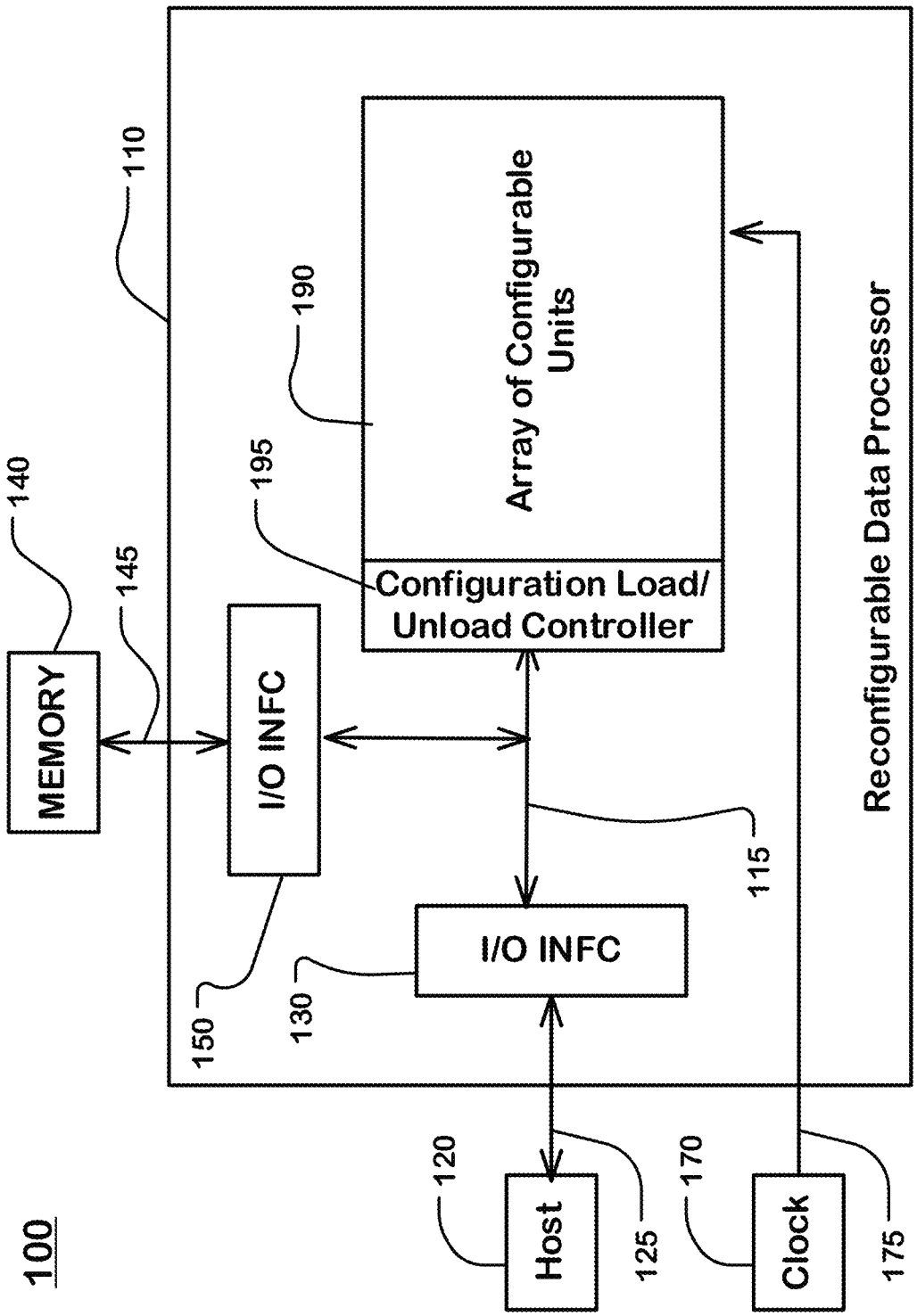
FIG. 1 is a system diagram illustrating a system including a host, a memory, and a reconfigurable data processor.

The following detailed description is made with reference to the figures. Example implementations are described to illustrate the technology disclosed, not to limit its scope, which is defined by the claims. Those of ordinary skill in the art will recognize a variety of equivalent variations on the description that follows.

Array Level Network (ALN)—a Flexible Network for Data-Flow Processing

A tile of an embodiment of a coarse-grain reconfigurable architecture (CGRA) is based on an array of fused compute-memory units (FCMUs), pattern memory units (PMUs), and/or pattern compute units (PCUs) arranged in two dimensions, M×N. Unless clearly noted from context, any reference to a FCMU, PCU, or PMU may refer to one or more of the other units. The communication between a set of FCMUs is performed over a (M+1)×(N+1) switch fabric called the array-level network (ALN) where each switch has connections to its neighboring FCMUs and to neighboring switches in each of the four directions.

The ALN includes three physical networks-Vector, Scalar and Control. The vector network and scalar networks are packet switched whereas the control network is circuit switched. Each vector packet consists of a vector payload and a header that includes information such as the packet's destination, sequence ID, virtual channel (aka flow control class) etc. Each scalar packet contains a word (32-bits) of payload and a header containing the packet's destination and the packet's type. The Control network consists of a bunch of single bit wires where each wire is pulsed to transmit a specific control token providing distributed control to orchestrate the execution of a program across multiple FMCUs. The scalar network can also be used to carry control information by overloading a scalar packet using its packet type field.

Parallel Applications such as Machine Learning, Analytics, and Scientific Computing require different types of communication between the parallel compute units and the distributed or shared memory entities. These types of communication can be broadly classified as point-to-point, one-to-many, many-to-one and many-to-many. The ALN enables these communication types through a combination of routing, packet sequence ID and flow control.

Routing of packets on the vector and scalar networks is done using two mechanisms-2D Dimension Order Routing (DOR) or using a software override using Flows. Flows can be used for multiple purposes such as to perform overlap-free routing of certain communications and to perform a multicast from one source to multiple destinations without having to resend the same packet, once for each destination.

Sequence ID based transmissions allow the destination of a many-to-one communication to reconstruct the dataflow order without having to impose restrictions on the producer/s. The packet switched network provides two flow control classes-end to end flow controlled and locally flow controlled. The former class of packet, VC_B, is released by a producer only after ascertaining that the consumer has space for it. The latter class of packet, VC_A, is loosely flow controlled and released into the network without knowing if the receiver has space for it. VC_A packets are used for performance critical communication where a non-overlapping route can be provided between the producer and consumer.

The core component of the ALN is the ALN switch. A packet or control pulse enters the ALN through an interface between the producing FCMU (X) and one of its adjacent switches. While in the ALN, the packet/pulse takes some number of hops until it reaches a switch adjacent to the consumer FCMU (Y). Finally, it takes the interface to Y to complete the route.

When a packet reaches a switch's input port, it is first inspected to see if it should be dimension order routed or flow routed. If it is the former, the destination ID is mapped to a unique output port. If it is the latter, the flow ID of the incoming packet is used to index into a table that identifies the output ports to route the packet to.

Packets from the two different flow control classes, VC_A and VC_B, are managed differently at the source port of every switch. Since VC_B packets are end-to-end flow controlled, they are always allowed to make forward progress through it regardless of the blocking conditions on VC_A packets.

Reference now is made in detail to the examples illustrated in the accompanying drawings and discussed below.

FIG. 1 is a system diagram illustrating a system including a host 120, a memory 140, and a reconfigurable data processor 110. As shown in the example of FIG. 1, the reconfigurable data processor 110 includes an array 190 of configurable units and a configuration load/unload controller 195. The phrase "configuration load/unload controller", as used herein, refers to a combination of a configuration load controller and a configuration unload controller. The configuration load controller and the configuration unload controller may be implemented using separate logic and data path resources or may be implemented using shared logic and data path resources as suits a particular embodiment. In some embodiments, a system may include only a configuration load controller of the types described herein. In some embodiments, a system may include only a configuration unload controller of the types described herein.

The processor 110 includes an external I/O interface 130 connected to the host 120, and external I/O interface 150 connected to the memory 140. The I/O interfaces 130, 150 connect via a bus system 115 to the array 190 of configurable units and to the configuration load/unload controller 195. The bus system 115 may have a bus width of carrying one chunk of data, which can be for this example 128 bits (references to 128 bits throughout can be considered as an example chunk size more generally). In general, a chunk of the configuration file can have a number N of bits of data, and the bus system can be configured to transfer N bits of data in one bus cycle, where N is any practical bus width. A sub-file distributed in the distribution sequence can consist of one chunk, or other amounts of data as suits a particular embodiment. Procedures are described herein using sub-files consisting of one chunk of data each. Of course, the technology can be configured to distribute sub-files of different sizes, including sub-files that may consist of two chunks distributed in two bus cycles for example.

To configure configurable units in the array 190 of configurable units with a configuration file, the host 120 can send the configuration file to the memory 140 via the interface 130, the bus system 115, and the interface 150 in the reconfigurable data processor 110. The configuration file can be loaded in many ways, as suits a particular architecture, including in data paths outside the configurable processor 110. The configuration file can be retrieved from the memory 140 via the memory interface 150. Chunks of the configuration file can then be sent in a distribution sequence as described herein to configurable units in the array 190 of configurable units in the reconfigurable data processor 110.

An external clock generator 170 or other clock signal sources can provide a clock signal 175 or clock signals to elements in the reconfigurable data processor 110, including the array 190 of configurable units, and the bus system 115, and the external data I/O interfaces.

Figure 2:
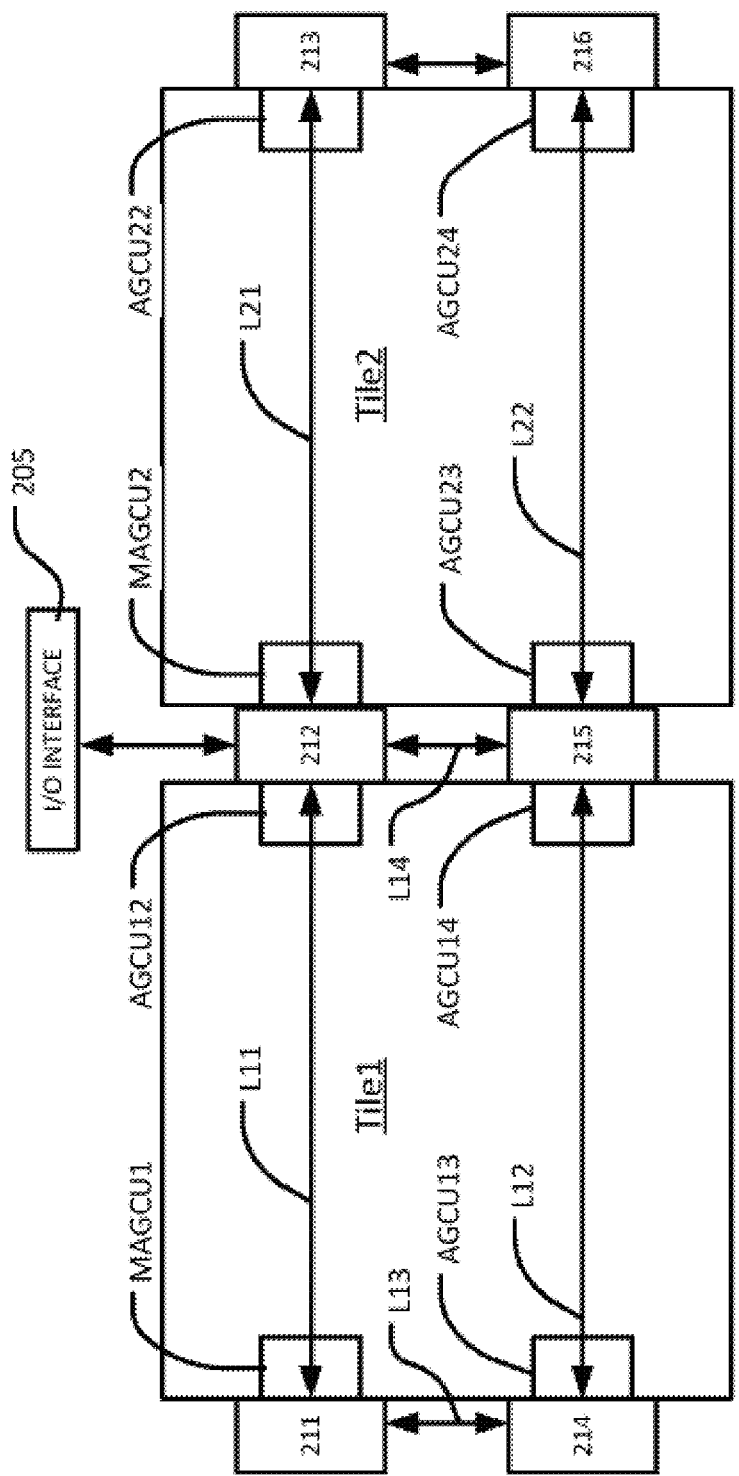
FIG. 2 is a simplified block diagram of a top level network and components of a CGRA (Coarse Grain Reconfigurable Architecture).

FIG. 2 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including an array level network (ALN) in this example. The bus system includes a top level network connecting the tiles to external I/O interface 205 (or any number of interfaces). In other embodiments, different bus system configurations may be utilized. The configurable units in each tile are nodes on the ALN in this embodiment.

Each of the two tiles has 4 AGCUs (Address Generation and Coalescing Units) (e.g. MAGCU1, AGCU12, AGCU13, AGCU14). The AGCUs are nodes on the top level network and nodes on the ALNs and include resources for routing data among nodes on the top level network and nodes on the ALN in each tile.

Nodes on the top level network in this example include one or more external I/O, including interface 205. The interfaces to external devices include resources for routing data among nodes on the top level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top level network and the ALN or networks.

The top level network is constructed using top level switches (211-216) connecting to each other as well as to other nodes on the top level network, including the AGCUs, and I/O interface 205. The top level network includes links (e.g. L11, L12, L21, L22) connecting the top level switches. Data travel in packets between the top level switches on the links, and from the switches to the nodes on the network connected to the switches. For example, top level switches 211 and 212 are connected by a link L11, top level switches 214 and 215 are connected by a link L12, top level switches 211 and 214 are connected by a link L13, and top level switches 212 and 213 are connected by a link L21. The links can include one or more buses and supporting control lines, including for example a chunk-wide bus (vector bus). For example, the top level network can include data, request, and response channels operable in coordination for transfer of data in a manner analogous to an AXI compatible protocol. See, AMBA® AXI and ACE Protocol Specification, ARM, 2017.

Top level switches can be connected to AGCUs. For example, top level switches 211, 212, 214 and 215 are connected to MAGCU1, AGCU12, AGC U13 and AGCU14 in the tile Tile1, respectively. Top level switches 212, 213, 215 and 216 are connected to MAGCU2, AGCU22, AGCU23 and AGCU24 in the tile Tile2, respectively. Top level switches can be connected one or more external I/O interfaces (e.g. interface 205).

Figure 3A:
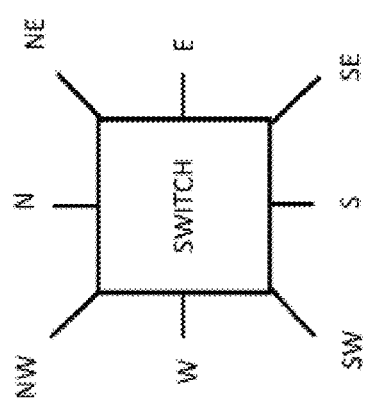
FIG. 3A illustrates an example switch unit connecting elements in an array level network.
Figure 3:
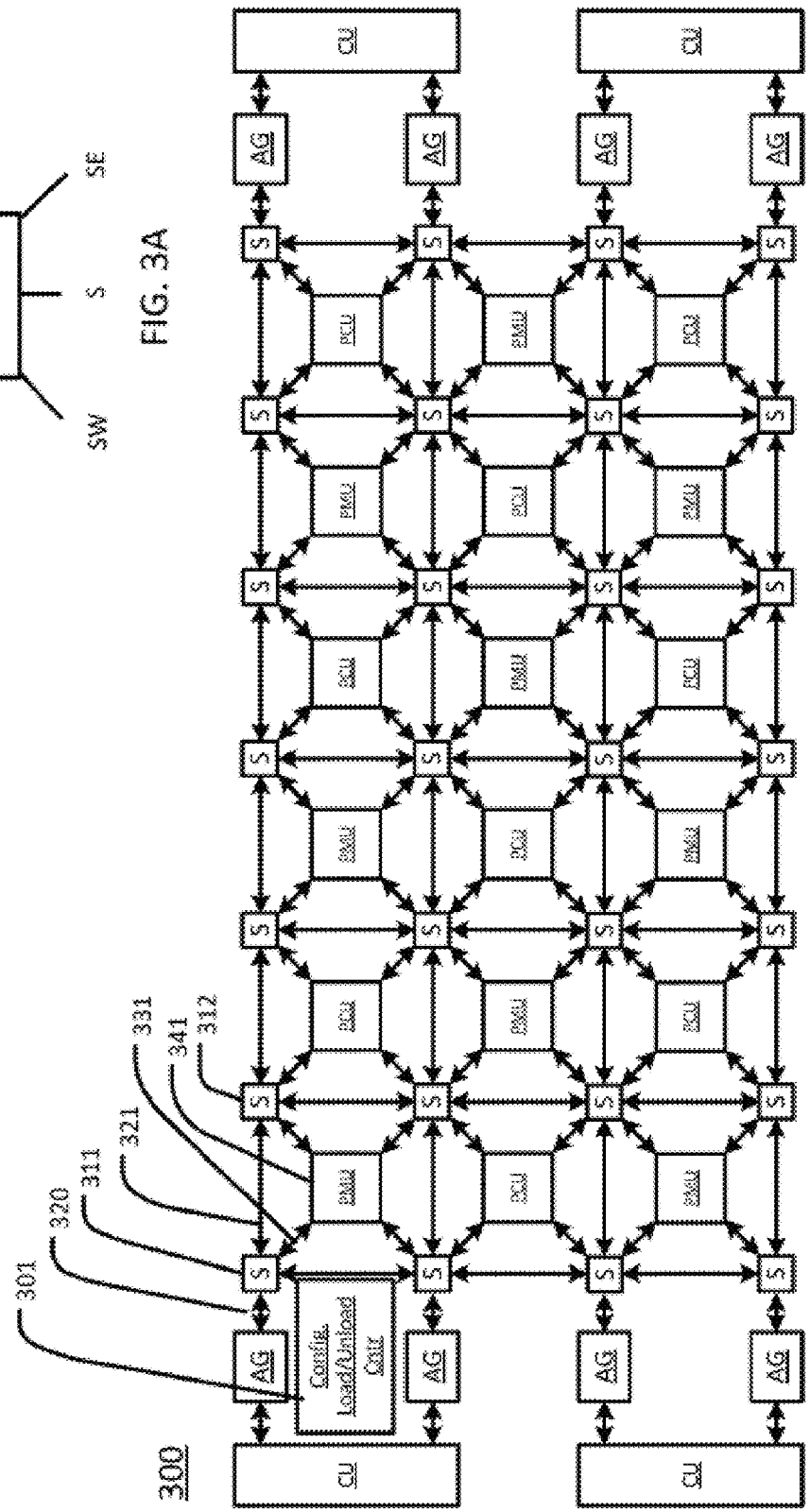
FIG. 3 is a simplified diagram of a tile and an array level network usable in the configuration of FIG. 2, where the configurable units are nodes on the array level network.

FIG. 3 is a simplified diagram of a tile and an ALN usable in the configuration of FIG. 2, where the configurable units in the array are nodes on the ALN.

In this example, the array of configurable units 300 includes a plurality of types of configurable units. The types of configurable units in this example, include Pattern Compute Units (PCU), Pattern Memory Units (PMU), switch units(S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units based on the contents of the bit file to allow all the components to execute a program (i.e., a machine). Program Load may also require the load of all PMU memories.

The ALN includes links interconnecting configurable units in the array. The links in the ALN include one or more and, in this case three, kinds of physical buses: a chunk-level vector bus (e.g. 128 bits of data), a word-level scalar bus (e.g. 32 bits of data), and a multiple bit-level control bus. For instance, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most significant bit first order of Chunk 5→Chunk 4→Chunk 3→Chunk 2→Chunk 1→Chunk 0. (Note that this most significant bit first order results in Chunk 5 being distributed in round 0 of the distribution sequence from the array configuration load controller.) For an unload operation, the configuration unload controller can write out the unload data of order to the memory. For both load and unload operations, the shifting in the configuration serial chains in a configuration data store in a configurable unit is from LSB (least-significant-bit) to MSB (most-significant-bit), or MSB out first.

FIG. 3A illustrates an example switch unit connecting elements in an ALN. As shown in the example of FIG. 3A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the ALN.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the ALN. For instance, a chunk of configuration data in a unit file particular to a configurable unit PMU 341 can be sent from the configuration load/unload controller 301 to the PMU 341, via a link 320 between the configuration load/unload controller 301 and the West (W) vector interface of the switch unit 311, the switch unit 311, and a link 331 between the Southeast (SE) vector interface of the switch unit 311 and the PMU 341.

Figure 4:
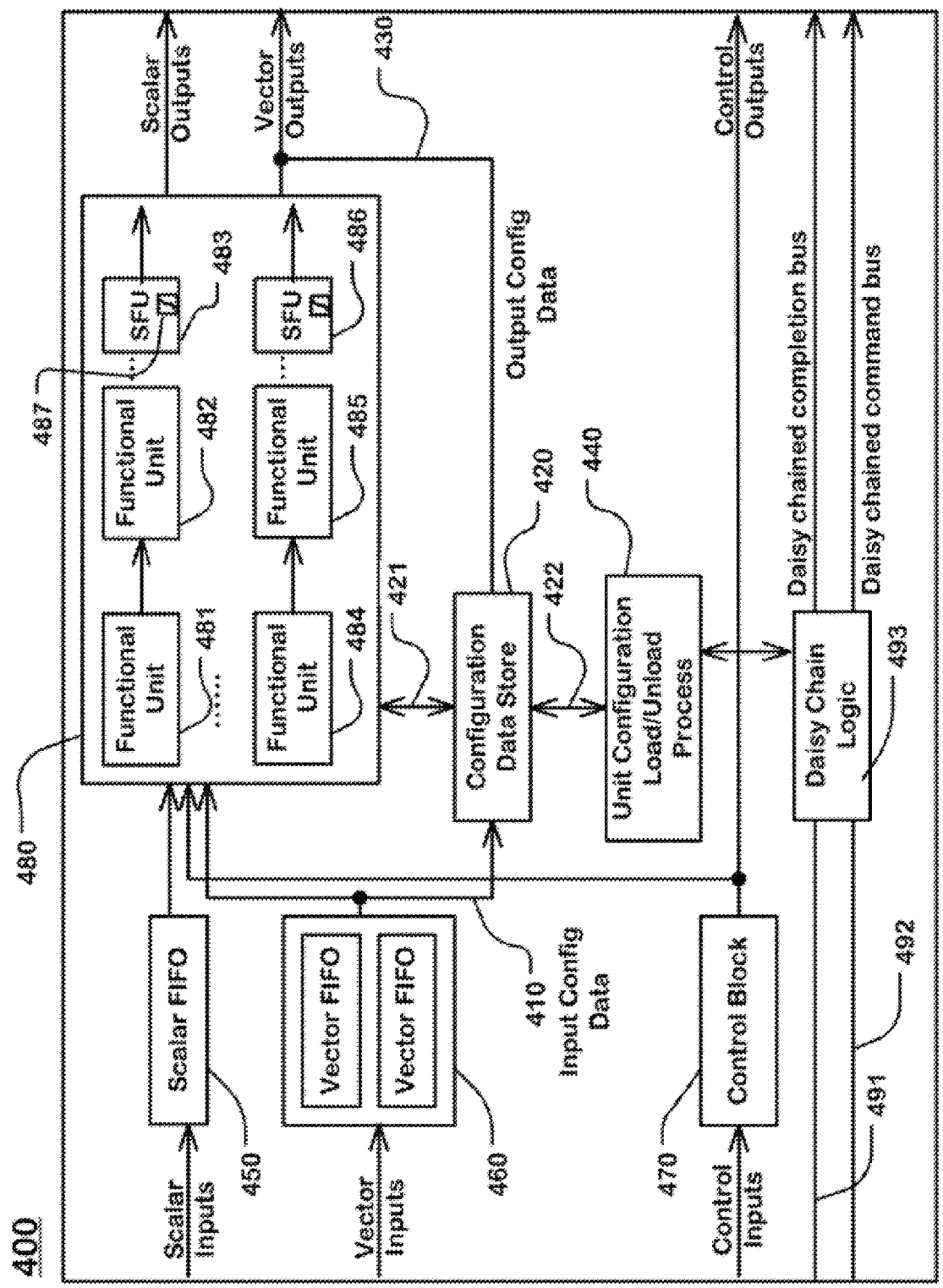
FIG. 4 is a block diagram illustrating an example configurable unit, such as a Pattern Compute Unit (PCU).

In this example, one of the AGCUs is configured to be a master AGCU, which includes a configuration load/unload controller (e.g. 301). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top level network. The data read from memory are transmitted by the master AGCU over the vector interface on the ALN to the corresponding configurable unit according to a distribution sequence described herein.

In one embodiment, in a way that can reduce the wiring requirements within a configurable unit, configuration and status registers holding unit files to be loaded in a configuration load process or unloaded in a configuration unload process in a component are connected in a serial chain and can be loaded through a process of shifting bits through the serial chain. In some embodiments, there may be more than one serial chain arranged in parallel or in series. When a configurable unit receives, for example, 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (150, FIG. 1). Each of the memory interfaces can be accessed using several AGCUs. Each AGCU contains a reconfigurable scalar datapath to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

FIG. 4 is a block diagram illustrating an example configurable unit 400, such as a Pattern Compute Unit (PCU). A configurable unit can interface with the scalar, vector, and control buses, in this example using three corresponding sets of inputs and outputs (410): scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 470, and control outputs are provided by the control block 470.

Each vector input is buffered in this example using a vector FIFO in a vector FIFO block 460 which can include one or more vector FIFOs. Likewise in this example, each scalar input is buffered using a scalar FIFO 450. Using input FIFOs decouples timing between data producers and consumers and simplifies inter-configurable-unit control logic by making it robust to input delay mismatches.

A configurable unit includes multiple reconfigurable datapaths in block 480. A datapath in a configurable unit can be organized as a multi-stage (Stage 1 . . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 420 is connected to the multiple datapaths in block 480 via line 421.

A configurable datapath organized as a multi-stage pipeline can include multiple functional units (e.g. 481, 482, 483; 484, 485, 486) at respective stages. A special functional unit SFU (e.g. 483, 486) in a configurable datapath can include a configurable module 487 that comprises sigmoid circuits and other specialized computational circuits, the combinations of which can be optimized for particular implementations. In one embodiment, a special functional unit can be at the last stage of a multi-stage pipeline and can be configured to receive an input line X from a functional unit (e.g. 482, 486) at a previous stage in a multi-stage pipeline. In some embodiments, a configurable unit like a PCU can include many sigmoid circuits, or many special functional units which are configured for use in a particular graph using configuration data.

Configurable units in the array of configurable units include configuration data stores 420 (e.g. serial chains) to store unit files comprising a plurality of chunks (or sub-files of other sizes) of configuration data particular to the corresponding configurable units. Configurable units in the array of configurable units each include unit configuration load logic 440 connected to the configuration data store 420 via line 422, to execute a unit configuration load process. The unit configuration load process includes receiving, via the bus system (e.g. the vector inputs), chunks of a unit file particular to the configurable unit and loading the received chunks into the configuration data store 420 of the configurable unit. The unit file loaded into the configuration data store 420 can include configuration data, including opcodes and routing configuration, for circuits implementing a sparse matrix multiply as described with reference to FIG. 9.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 410 can be provided to a vector FIFO as vector inputs, and then be transferred to the configuration data store 420. Output configuration data 430 can be unloaded from the configuration data store 420 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 4, a daisy-chained completion bus 491 and a daisy-chained command bus 492 are connected to daisy-chain logic 493, which communicates with the unit configuration load logic 440. The daisy-chain logic 493 can include load complete status logic, as described below. The daisy-chained completion bus is further described below. Other topologies for the command and completion buses are clearly possible but not described here.

A Pattern Memory Unit (e.g. PMU) can contain scratchpad memory coupled with a reconfigurable scalar datapath intended for address calculation, along with the bus interfaces used in the PCU. PMUs can be used to distribute on-chip memory throughout the array of reconfigurable units. In one embodiment, address calculation within the memory in the PMUs is performed on the PMU datapath, while the core computation is performed within the PCU.

Array Level Network

The core of a tile consists of M×N Fused Compute and Memory Units (FCMUs) that are arranged in a 2-D grid. Additionally, a tile instance also contains four Address Generation Units (AGCUs) complexes, one per quadrant. The components of an ALN tile use a switched interconnect that consists of a grid of M+1×N+1 switches. M and N can be any practical number based on the process technology used. In at least one embodiment, M may be 16 and N may be 4 for a grid of 64 FCMUs and 85 switches per tile.

Each switch has 8 interfaces. The North, South, East and West interfaces of a switch are used for inter-switch connections. The Northeast, Southeast, Northwest and Southwest interfaces of a switch are each used to make connections to FCMU instances. A set of 2 switches in each tile quadrant have connections to an AGCU complex.

The ALN interconnect consists of 3 physical networks, vector, scalar and control. The vector network datapath may carry different widths of data, depending on the embodiment, such as 128 bits as its payload. The ALN carries data from producers to consumers in tile.

The scalar network has a 32-bit payload. This network is used to carry scalar operands or control information. The control network is used to carry control handshakes such as tokens, coarse-grained credits between any two points in a tile or tile group.

The ALN interconnect may extend across all tiles that are present in the chip in some embodiments. The border switches between any two neighboring tiles can be configured to allow or disallow communication between those tiles. This feature may be useful to maintain separation between tiles running distinct programs or to allow communication between tiles running the same program.

The vector and scalar networks are packet switched while the control network is circuit switched. A packet is a unit of transmission that occupies 1-beat on a network. Each packet contains a destination identifier that identifies the geographical coordinates of the destination switch, and an interface identifier that identifies the interface used to reach the destination FCMU or AGCU. In the rest of the document, Destination ID is used to denote the tuple containing the destination and interface identifiers.

If Destination ID based routing is enabled (Packet.SW Routing=0), every switch looks at the destination ID of a packet and uses a 2-D dimension order route to transport the packet to its destination. The routing algorithm is static and traverses the row-dimension before traversing the column-dimension to the destination. This fixed routing algorithm prevents reordering of packets between any source-destination pair.

Flow ID based routing is enabled by setting the SW Routing bit in the packet. For this type of routing, software is able to transport packets around statically determined congestion points in the ALN interconnect. Flow ID based routing can also be used to provide multicasting that is required for executing several deep learning algorithms. To implement Flow ID based routing, each switch source port provides a 16-entry flow table containing a bit-map of destination interfaces that packets of that flow need to be forwarded on.

In a packet-switched network, there is a possibility of contention if the compiler maps a problem such that hop sharing occurs. However, since the routes are predictable, it is possible for the compiler to detect these conditions and use flow ID based routing to prevent contention of high bandwidth transmissions. Multiple low bandwidth interactions can be configured to share one or more hops without a noticeable loss in performance.

The vector network uses packets that may include a variety of information. A vector packet format for one embodiment is provided in Table 1 below:

TABLE 1

| Field | Description |
|---|---|
| Payload | Data. # of bits depends on bas width, e.g. 128 bits |
| Sequence ID | Used for row address calculation if receiving data from multiple concurrent senders. Only relevant for transmissions to a PMU. Size of field is dependent upon the embodiment buy may be 16 bits or less in some embodiments. |
| Program Load | A single bit that, when set, indicates that the packet is a program load packet. with Switch ID[6] = Tile ID == 0 or 1 and Switch ID[10] = Tile ID == 1 or 3 |
| Destination ID | The width of this file may depend upon the size of the tile (i.e. M & N). So for a tile having 17 × 5 switches requiring 5 bits for the row number and 3 bits for the column number, this field may be at least 10 bits wide.<br>< interface[1:0], destination Switch ID, ><br>Switch ID = { Column# of switch, Row# of switch }<br>Interface:<br>Northeast = 01, // PMU or AG<br>Southeast = 11, // PMU or AG<br>Northwest = 00, // PCU or AG<br>Southwest = 10 // PCU or AG |
| SW Routing | A single bit that indicates if routing is done by hardware or by software. If set, the 4 LSBs of the Destination ID field is used to represent Flow ID. |
| Flow ID | Every switch source interface has a flow table that can be configured with routes by software. Overloaded with the Destination ID field. This field may be 4 bits wide in some embodiments. |
| Virtual Interface | This field is only valid for transmissions to an AG instance. It is used to represent the virtual AG ID within a physical AG instance. The width of this field may depend upon the number of AG instances per tile. |

For a many to one transmission with N senders, the compiler will be expected to assign a unique source number in the set [0,N−1] to each of the N senders. The Sequence ID field contains two components, source number and a sequence number. These components of the Sequence ID field are variable length depending on the value of N.

For example, if a transmission is 96-1, some bits in the vector packet are used to represent the source number (in the set [0,95]) and other bits in the vector packet are used to represent the sequence number of the transmission from each source. The length of the components of Sequence ID is configured by the compiler. Sequence ID is used only for many one transmissions destined to a PMU. For all other transmissions, the Sequence ID field of a packet is ignored.

The PCU, PMU and AGCU components are required to provide the following or similar configuration fields to establish seqID based communication between that agent and a destination that uses the seqID to either compute an address or to filter inputs.

SourceNum: This field is an ID assigned by the compiler to the producers in a many-one communication.

SeqNumBits: Indicates the number of bits of the seqID field that are reserved for sequence number. The remaining bits are available to send the source number.

SeqNumberMax: Indicates the max value of the sequence ID counter that generates the sequence number. The sequence number is generated modulo this value if SeqIDResetonMax is set. The sequence ID counter is always cleared on a context done regardless of the value of this counter.

SeqIDResetonMax: Set to indicate that the sequence ID should be reset when it reaches the max value configured in SeqNumberMax The SW Routing bit is used by a switch to select Flow ID based routing over Dest ID based routing. The Virtual Interface field of a packet is used by packets that are destined to an AG instance. It is used to identify one of 8 virtual AGs that are part of a physical AG instance.

The Scalar network uses packets that can be used to carry either scalar operands or control information in the form of credit returns etc. One of the use cases for multicast support in the scalar network is for an agent to pass tokens to multiple dependents using a single transmission. A specific example of this is if a PMU has to return N-buffer credits to a multitude of concurrent senders. Note that there is no Sequence ID field in a scalar packet. A Scalar packet format for one embodiment is provided in Table 2 below:

TABLE 2

| Field | Description |
|---|---|
| Payload | 32 bits of Scalar Data. If used for Control, the 4 LSBs indicate the credit units returned. |
| Destination ID | The width of this file may depend upon the size of the tile (i.e. M & N) and may match the Destination ID field of the vector packet.<br>< interface[1:0], destination Switch ID, ><br>Switch ID = { Column# of switch, Row# of switch }<br>Interface:<br>Northeast = 01, // PMU or AG<br>Southeast = 11, // PMU or AG |

TABLE 2-continued

| Field | Description |
| --- | --- |
| | Northwest = 00, // PCU or AG<br>Southwest = 10 // PCU or AG |
| SW Routing | A single bit that indicates if routing is done by hardware or by software. If set, the 4 LSBs of the Destination ID field is used to represent Flow ID. |
| Control | A single bit that, if set, indicates that the payload contains control information such as a credit-return. |
| Flow ID | Every switch source interface has a flow table that can be configured with routes by software. Overloaded with the Destination ID field. This field may be 4 bits wide in some embodiments. |
| Virtual Interface | This field is only valid for transmissions to an AG instance. It is used to represent the virtual AG ID within a physical AG instance. The width of this field may depend upon the number of AG instances per tile. |

Virtual Channels

The vector network supports two flow control classes, VC_A and VC_B. The progress of packets of one flow control class is independent of the other.

The following case explains the justification for two flow control classes.

- A PCU, i, executes a stream of 2-operand instructions with one operand sourced by an input stream from PMU_A and another sourced by an input stream from PMU_B.
- PMU_A sources operands faster than PMU_B. This causes PCU_i's input FIFO to fill up and apply backpressure on the network.
- The release of back pressure depends on the receipt of the operand from PMU_B. However, the fullness of the input interface due to packets from PMU_A leads to the PCU being unable to accept any packets from PMU_B.

Creating two flow control classes with one guaranteeing forward progress solves this forward progress violation. I.e. it separates the PMU_A-PCU_i communication from the PMU_B-PCU_i communication. In this architecture VC_B transmissions are guaranteed to make forward progress because they are end-to-end flow controlled.

Figure 5A:
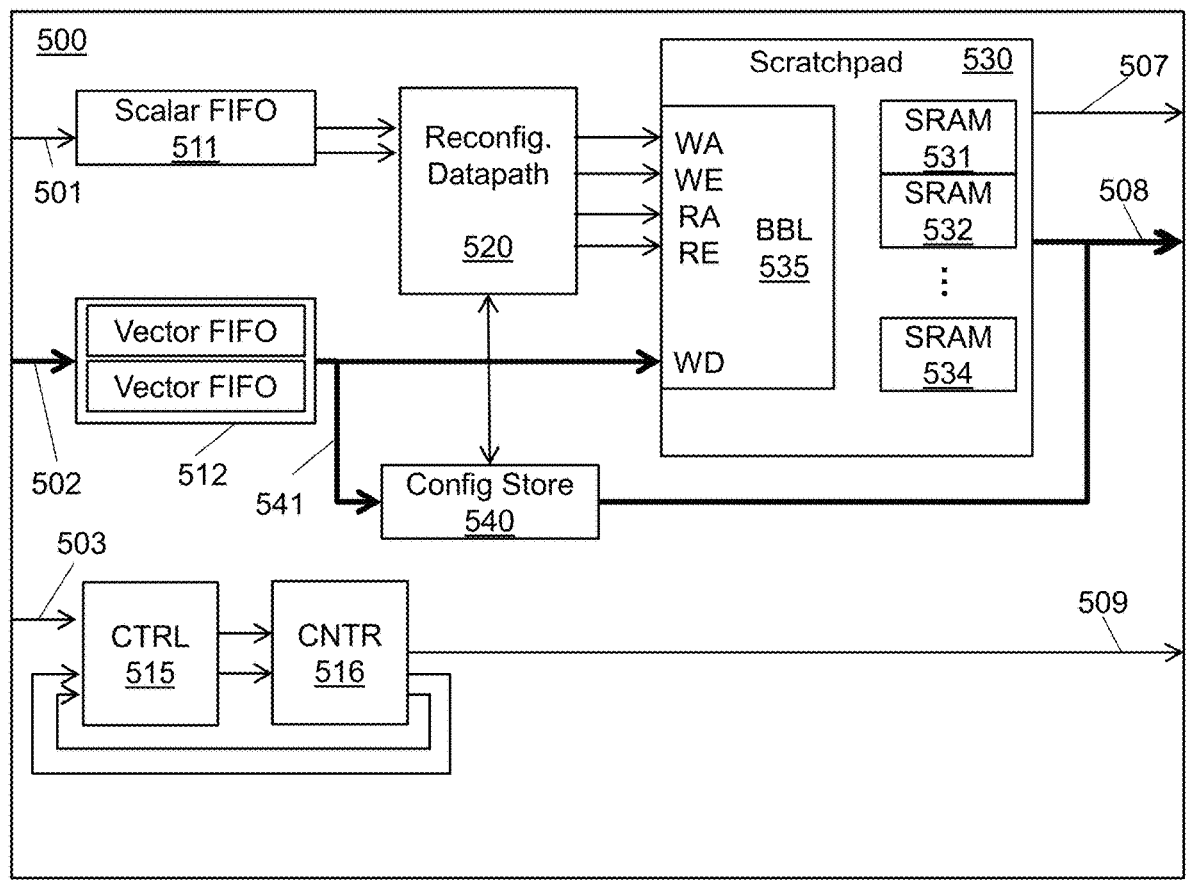
FIG. 5A is a block diagram illustrating an example of another configurable unit, such as a Pattern Memory Unit (PMU).

FIG. 5A is a block diagram illustrating an example configurable unit 500, such as a Pattern Memory Unit (PMU). A PMU 500 can contain scratchpad memory 530 coupled with a reconfigurable scalar data path 520 intended for address calculation (RA, WA) and control (WE, RE) of the scratchpad memory 530, along with the bus interfaces, scalar input 501, scalar output 507, vector input 502, vector output 508, control input 503, and control output 509. The vector input 502 can be used to provide write data WD to the scratchpad 530. The data path 520 can be organized as a multi-stage reconfigurable pipeline, including stages of functional units FUs and associated pipeline registers PRs that register inputs and outputs of the functional units. A PMU 500 can be used to store distributed on-chip memory throughout the array of reconfigurable units (e.g. 190 in FIG. 1, Tile1 and Tile2 in FIG. 2, or 300 in FIG. 3).

A scratchpad 530 is built with multiple SRAM banks (e.g. 531-534). Various embodiments may include any number of SRAM banks of any size, but in one embodiment the scratchpad may include 256 kilobytes (kB) of memory organized to allow at least one vector bus width of data (e.g. 128 bits or 16 bytes) at a time. Banking and buffering logic (BBL) 635 for the SRAM banks in the scratchpad can be configured to operate in several banking modes to support various access patterns. A configurable unit as described herein can include a lookup table stored in the scratchpad memory 530, from a configuration file or from other sources. In a configurable unit as described herein, the scalar data path 520 can translate a section of a raw input value I used for addressing lookup tables implementing the functions f'(I) and f"(I), into the addressing format utilized by the SRAM scratchpad memory 530, adding appropriate offsets and so on, to read the entries of the lookup table stored in the scratchpad memory 530 using the sections of the input value I. A PMU 500 can include write address calculation logic and read address calculation logic that provide write address WA, write enable WE, read address RA and read enable RE to the banking buffering logic 535. Based on the state of the local FIFOs 511 and 512 and external control inputs, the control block 515 can be configured to trigger the write address computation, read address computation, or both, by enabling the appropriate counters 516. A programmable counter chain 516 and control block 515 can trigger PMU execution through control output 509.

Similarly to the PCU 400 shown in FIG. 4, a PMU 500 in the array of configurable units include a configuration data store 540 to store unit files comprising a plurality of chunks (or sub-files of other sizes) of configuration data 541 particular to the PMU 500. The configuration data store 540 may be loaded similarly to the configuration data store 420 of FIG. 4 by unit configuration load logic connected to the configuration data store 540 to execute a unit configuration load process. The unit configuration load process includes receiving, via the bus system (e.g. the vector inputs), chunks of a unit file particular to the configurable unit and loading the received chunks into the configuration data store 540 of the configurable unit. The unit file loaded into the configuration data store 540 can include configuration data 541, such as, but not limited to, configuration and/or initialization data for the reconfigurable datapath 520, the programmable counter chain 516, and the control block 515.

So a Pattern Memory Unit (e.g. PMU) 500 can contain scratchpad memory coupled with a reconfigurable scalar datapath 520 intended for address calculation and communication using bus interfaces 501-503, 507-509 to communicate with a PCU 400. PMUs 500 can be used to distribute on-chip memory throughout the array of reconfigurable units. In one embodiment, address calculation within the 530 memory in the PMU 500 is performed on the PMU datapath 520, while the core computation is performed within the PCU 400. In some implementations, the reconfigurable scalar datapath 520 may be used to generate a destination ID table lookup value as described below.

Figure 5B:
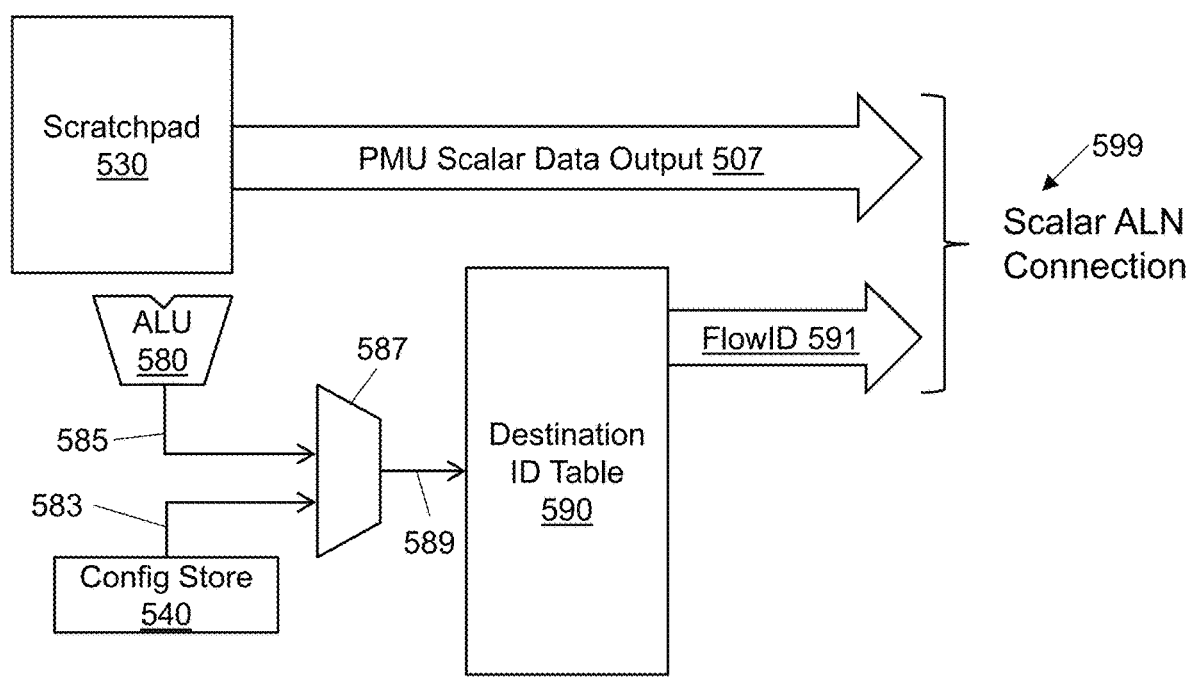
FIG. 5B is a block diagram showing a Destination ID table that may be included in some implementations of PMU.

FIG. 5B shows an aspect of a PMU 500 that may be included in some implementations. FIG. 5B shows a portion of the scalar datapath of the PMU, but the same block diagram could apply to the vector datapath of the PMU, either as a completely separate block or with shared components, such as a shared table 590.

The scratchpad 530 may generate a PMU Scalar Data Output 507 which may any width, but may be 32 bits in some implementations. The scratchpad 530 may, alternative or in addition, generate a PMU Vector Data Output 508, as shown in FIG. 5A.

The PMU 500 may also include a Destination ID table 590 that can have any number of entries, including, but not limited to any power of 2, such as 8, 16, 32, or 64 entries. The Destination ID Table 590 receives a dynamic destination ID field 589 which selects an entry in the Destination ID Table 590 to use as the FlowID 591 for a particular data transfer over the Array Level Network (ALN). The PMU 500 has one or more Scalar ALN Connections 599 that include a data section coupled to the PMU Scalar Data Output 507 and a FlowID field coupled to the FlowID 591 provided by the output of the Destination ID Table 590. In some implementations, the PMU 500 may have separate Destination ID Tables 590, but in other implementations, the Destination ID Table 590 may be shared between the Scalar ALN Connection 599 and the Vector ALN Connection. In at least one implementation, the Destination ID Table 590 includes Scalar FlowID bits coupled to the FlowID field of the Scalar ALN Connection 599 and Vector FlowID bits coupled to the FlowID field of the Vector ALN Connection. In some implementations, the Destination ID Table may have two ports so that there are separate dynamic destination ID fields 589 generated, one for the Scalar ALN Connection 599 and one for the Vector ALN Connection.

Some implementations may include are two modes for calculating the dynamic destination ID field 589. It may be generated statically from static ID bits 583 provided from the configuration store 540 of the PMU 500, or it may be generated dynamically from dynamic ID bits 585 generated from an arithmetic logic unit (ALU) 580 or other logic in the PMU 500. The dynamic destination ID field 589 may be driven by a selector (e.g. a multiplexor) 587 which can select either the static ID bits 583 or the dynamic ID bits 585 to use as the dynamic destination ID field 589 sent to the Destination ID Table 590. A read operation of the scratchpad 530 includes a context that includes a config bit to select either the static ID bits 583 or the dynamic ID bits 585 to use as the dynamic destination ID field 589. Some PMUs 500 may have a default mode to select the static ID bits to emulate the behavior of PMUs 500 that may not include the capability of generating the dynamic ID bits 585. A read context may include two sets of static ID bits, one for vector output and one for scalar output. In at least one implementation, the static ID bits for the NW vector output port and NW scalar output port are in a first data structure of the configuration store 540 and the static ID bits for the SW vector output port and SW scalar output port are in a second data structure of the configuration store 540.

The other mode for calculating the dynamic destination ID field 589 uses the dynamic ID bits 585. In each read operation context, an ALU 580 may be used the dynamic ID bits 585 which are then selected by the selector 587 as the dynamic destination ID field 589. Some implementations may have separate ALUs 580 to calculate separate dynamic ID bits. The ALUs 580 may be dedicated to the task of calculating the dynamic destination ID field(s) 589 or may be a part of the reconfigurable datapath 520.

A credit counter may be used to manage the transfers. If using control packets to return credits, each credit counter may utilize an exclusive bit on the incoming control bus.

If using credit return over the scalar bus of the ALN the RTL implementation has two parts: one for routing incoming credit returns to the correct credit counter, and a second for encoding the scalar payload when sending credit returns out via scalar ports. Note the second part requires other units to be updated too.

Processing incoming credit return: Similar to credit over control, each credit counter may utilize an exclusive bit on the incoming scalar control packet.

Sending credits over scalar: The PMU 500 sets a selected bit in the scalar payload to 1 when returning credits for incoming data scalar packets.

The Destination ID Table 590 may include several different fields, depending on the implementation. There may be a one-to-one mapping between credit counters and entries in the Destination ID Table 590. Various implementations may include any combination of the following fields as well as other fields, as long as there is at least one FlowID field.

VC/Credit Disable
Vector FlowID Valid
Vector FlowID
Scalar FlowID Valid
Scalar FlowID In some cases, the NW/SW scalar output port could be used for scalar control packet and scalar data packet, and a data packet could be either from a vector-to-scalar read or computed from reconfigurable datapath 520. Also, when sending scalar control packets, as reconfigurable datapath 520 is not used, static ID bits 583, may be used.

In some implementations, dynamic destination ID field 589 could be either:

A Static value where the context for a read/write operation controls the selector 587 to use static ID bits 583 from the configuration store as the dynamic destination ID field.

A Dynamic value where a scalar data packet is a vector to scalar read packet or the scalar data packet is generated through the reconfigurable datapath 520 and the calculation of the dynamic ID bits is pipelined with read enable signals. In such an implementation, the reconfigurable datapath 520 (or ALU 580) is programmed and the PMU 500 can internally route the FlowID 591 to the proper ALN port based on the context.

Figure 6:
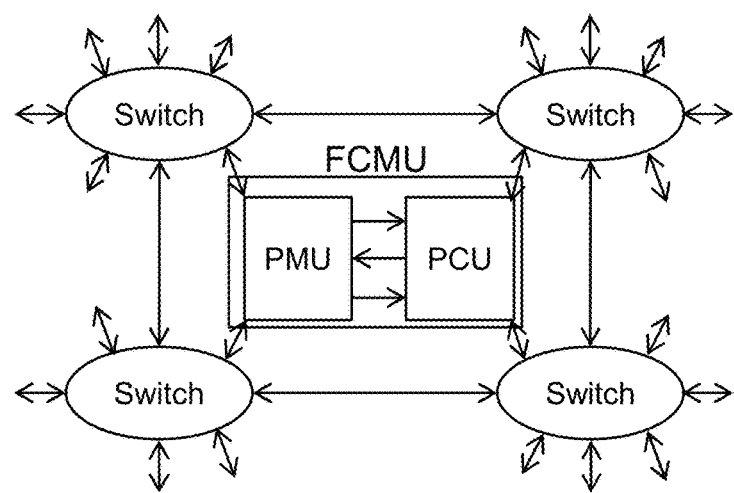
FIG. 6 is a block diagram of an embodiment of a fused compute and memory unit (FCMU).

FIG. 6 is a block diagram of an embodiment of a fused compute and memory unit (FCMU). Each line with an arrow on at least one end represents a connection of all three physical networks, a connection in the vector network, a connection in the scalar network, and a connection in the control network. A referral to a network connection may be considered to indicate a connection of all three physical networks unless otherwise indicated by context. The switches shown are a part of the ALN and may connect to additional FCMUs and switched in a tile.

The FCMU includes a PMU and an PCU which may have an asymmetric network connection between them, allowing two simultaneous connections on each of the physical networks from the PMU to the PCU (e.g. there are two network connections from the PMU to the PCU) and only a single network connection from the PCU to the PMU. Other embodiments may have symmetric network connections between the PCU and PMU or some other number of connections. Note that these internal connections in the FCMU between the PCU and PMU are not considered to be part of the ALN but they use end-to-end flow control.

Note that the NW and SW ALN connections of the FCMU connect to the PMU and the NE and NW ALN connections of the FCMU connect to the PCU. While all of the network connections are shown to be bi-directional, in some embodiments, one or more of the ALN connections of the FCMU may be unidirectional.

There are three types of switch interfaces in the ALN scalar and vector networks (Agent refers to a FCMU, PCU, PMU or AGCU):

Switch-to-Agent
Agent-to-Switch
Switch-to-Switch

An Agent-to-Switch transaction uses a credit-based flow controlled with the sender maintaining 3 credits. The choice of 3 may help to cover the round-trip from the driving of a packet by the sender to the receipt of an acknowledgment from the receiver indicating that the packet has been consumed. The transaction may be thought of as having a three-stage pipeline:

S1: Sender drives valid data.
S2: Receiver (switch-port) performs arbitration.
S3: Receiver sends an acknowledgment if arbitration is successful.

For vector transmissions, an Agent-to-Switch interface can be used to transmit either VC_A or VC_B packets. However, for a given program, the VC bound to a given interface is fixed. The Agent-Switch receiving interface of each switch may include a single 3-entry FIFO for receiving vector packets and a 3-entry FIFO for receiving scalar packets A Switch-to-Agent interface uses a similar credit-based flow for transactions, each receiving interface, however, may advertises a different number of credits >=3. Although various embodiments may assign a various credit counts to the different interfaces, the number of interface credit counts seen by the sending switch for the FCMU and AGCU interfaces for one embodiment are shown below:

PCU NE Vector 8
PCU SE Vector 64
PMU NW Vector 3
PMU SW Vector 3
AGCU 3
All Scalar Interfaces 32

A Switch-to-Switch vector interface cannot be bound to a single VC class. Thus, the receiver on this interface is required to maintain logically separate VC FIFOs. As described above, for full throughput, each FIFO may be 3-entries deep. However, some embodiments may use a 4-entry FIFO (instead of 6-entries) implementation that achieves full throughput.

The source port at each destination provides a 3-flop general purpose list (gp_list) that can accept VC_A or VC_B packets, and a single flop b_list that is dedicated for VC_B packets only. This dedicated entry is used for a VC_B packet only if the gp_list is full and its purpose is to allow VC_B to make progress independent of VC_A.

The sender maintains two credit counters, a general purpose credit counter (gp_counter) that is initialized to 3 and a dedicated VC_B counter (b_counter) that is initialized to 1. The sender receives separate credit acks for the gp_counter and b_counter.

In some embodiments on the Switch-to-Switch interface, a sender pulses valid_a or valid_b to indicate a transmission intended for the gp list or the b list, respectively. The receiver pulses ack_a to return a gp_counter credit and ack_b to return a b_counter credit. As the valid* signals are repurposed, the VC bit in the packet may be used by the receiver to maintain separation between packets of different traffic classes.

The sending agent can send a packet under the following conditions:

For an VC_A packet, if the gp_counter is >0.

For a VC_B packet if the gp_counter is >0 or if the b_counter >0

The destination maintains a 3 entry gp_list and a single entry b_list. For "gp" packets, insertion is done into the first available entry. As both VC_A and VC_B packets can be inserted into the gp list, FIFO order of packets within each VC is maintained using separate state bits. Dequeue of packets in the gp and b lists is strictly done in FIFO order.

The switch-to-switch scalar interface is similar to an agent-to-switch scalar interface.

A PCU provides a set of network specific structures for configuration by the compiler. A PCU has 2 external vector input interfaces. It has an identical number of external scalar inputs. The northeast vector input is received by an 8-entry A FIFO. This interface may be restricted to use VC_A only. The southeast vector input is received by a 64-entry B FIFO. This interface may be restricted to use VC_B only. Each of the scalar interfaces provides a 32-entry FIFO. Thus, there are 3 external input interfaces, one vector and 2 scalar, that are end-to-end flow controlled. The compiler can configure a control or scalar out interface to return credits for each of these input interfaces. The specific fields that are required to be configured are scalarOutXbar_sel and creditReturnIf. The PCU hardware provides 3 counters to count credit returns, one per input interface. The counters are used so the compiler may choose to enable credit returns with a currency greater than 1 by configuring creditReturnUnit.

A PCU vector output can be configured as VC_A or VC_B by a program. These are setup using the creditDisable field. The PCU provides 2 credit counters to track credits for these two potential end-to-end credit interfaces. A control in or scalar in interface can be configured as the interface that return credits for each of the above counters. Mapping a credit return interface to the appropriate counter is done using creditIncXbar_sel. The compiler can set up the communication such that the credit return unit/currency is greater than 1 by configuring creditUnit.

The packet header fields for the 2 external inputs are also configured by the compiler.

The compiler sets up the flow, {srcNum, srcBits}, destID fields for the vector output to setup software routing, provide the information for seqID insertion, and the destID for the target of the communication, respectively. Similarly, the compiler sets up the flow, destID fields for a scalar output.

Similar to the PCU, the PMU provides a set of network specific structures for configuration by the compiler. A PMU has 2 external vector input and scalar interfaces. The two vector inputs are muxed into a single interface FIFO.

The vector input is implied to belong to the VC_B class but is uses a coarse-grained credit interface, i.e. if configured by the compiler, the PMU will return a "done" token when the buffer being written by the vector input is consumed. The PMU uses the seqID field of the vector packet in the address computation as configured by the compiler.

There are 4 external input interfaces, 2 vector and 2 scalar, that are end-to-end flow controlled. Of these, the two scalar inputs are the only ones that require the PMU to return (fine-grained) credits. The compiler can configure a control or scalar out interface to return credits for each of these input interfaces. The specific fields that may be configured are outFifo_scalarOutXbar_sel and credit_creditReturnIf. The PMU hardware provides 2 counters to count credit returns, one per scalar input interface. The counters are used so the compiler may choose to enable credit returns with a currency greater than 1 by configuring credit_creditReturnUnit.

A PMU has 2 external vector and 2 external scalar outputs. The vector output can be configured as VC_A or VC_B by a program. These are setup using the credit_creditDisable field. The PMU provides 4 credit counters to track credits for these potential end-to-end credit interfaces. A control in or scalar in interface can be configured as the interface that return credits for each of the above counters. Mapping the credit return interfaces to the appropriate counter is done using the credit_e2eIncXbar_sel. The compiler can set up the communication such that the credit return unit/currency is greater than 1 by configuring credit_creditUnit.

During program load, the switch performs its function as a dimension order routing agent for packets that are destined to other switches, PMUs or PCUs. It also receives packets that it consumes to load its configuration registers. In order for a switch to consume a vector packet, the AGCU can do the following:
  set the destination ID of the vector to match the ID of the switch being loaded.
  set the MSB (interface) bits of the destination ID to NORTHWEST
  set the PLOAD bit On receiving a packet with the above settings, a switch directs the packet towards its northwest destination port. During "execute" state, this port is used to communicate with the B-Fifo of a PCU. As the PCU B-Fifos are unused during program load, this interface can be used for program load without causing back pressure on the network due to the long-latency of a program load operation. The vector received at the northwest port with PLOAD=1 is sent to a configuration block that serially shifts it into the switch configuration registers.

A switch contains 8 counters that are checkpointed during unload. The contents of these registers and the switch's configuration registers are packaged into vectors and transmitted out of the tile using the northeast source port of the switch. During execute or program load mode, this port is driven by the southwest vector output port of the PMU or an AGCU instance. The AGCU does not drive data into the tile during the checkpoint state and the PMU drives its checkpoint data on its northwest vector out port. This leaves a switch's northeast port available for driving the switch's checkpoint data out of the tile.

Switch Microarchitecture

An ALN switch contains a datapath for each of the scalar, vector and control networks that form the ALN. The vector datapath contains a switch with up to 8 input ports and 8 output ports. There are ports for each of north, south, east, west, northeast, northwest, southeast and southwest directions.

The source ports are divided into two categories: Switch-to-Switch and Agent-to-Switch. The ports along the east, west, south and north directions are Switch-to-Switch ports while the remaining ports are Agent-to-Switch ports.

The Switch-to-Switch source interface was described earlier. FIFO order per VC is maintained for packets in the gp and b lists. If the packet is marked for SW Routing, the flow ID of the packet at the head of each (A and B) FIFO is used to index into a flow table to determine the port/s that the packet needs to be forwarded to. The destination port is identified by a bit-mask. For SW routed packets, the bitmask could be multi-hot (denoting a multicast).

If the packet is not marked for SW Routing, the destination ID of the packet and the ID of this switch are used to determine the destination port that the packet needs to be forwarded to. The destination port is identified by a bit-mask.

An arbiter selects between the heads of these FIFOs. The winning packet is sent to all the ports identified in its destination bit-mask. This arbiter toggles its anchor every cycle a selection is made. Note, that the arbiter state toggles even if the winner at the source port does not win arbitration at the destination.

Multicasts can be enabled using the flow table. In this case, a packet stays at the head of its VC FIFO until it successfully wins arbitration at all destination ports. When it does so, the corresponding FIFO head is advanced to the next entry. For example, consider the head of a VC FIFO with a destination bit mask of 8'1001_0001 that first wins arbitration in destination port 0, followed by port 7 and port 4. In this case, the packet remains at the head of its VC FIFO but it destination bit mask changes to 8'b1001_0000 and then to 8'b0001_0000 and 8'b0000_0000 with each destination arbitration win.

The Agent-to-Switch interface was also described earlier. This source port is identical to the Switch-to-Switch source port with the exception that there is only a single FIFO that sends packets to the destination port/s for arbitration.

There are two types of destination ports in the switch: Switch-to-Switch and Switch-to-Agent. A destination port performs round robin arbitration between the winners from all sources that can map to it. In order for arbitration to the successful, there has to be a hop credit available to send the winner to the downstream destination.

For a Switch-to-PCU port, the destination port maintains VC_A and VC_B counter where the hop credits for each are set at 8 and 64, respectively. For a Switch-to-PMU port, the destination port hop credits are set at 3. For a Switch-to-Switch port, gp_list credits are set at 3 and b_list credits are set at 1. For a VC_B packet, the destination port is available if gp_list or b_list credits are non-zero. For a VC_A packet, the destination port is available if gp_list credits are non-zero.

The Scalar datapath of the switch is a subset of the Vector datapath. It is not as wide and contains only a single VC. A Scalar Switch-to-Agent destination port maintains a counter where the hop credits are set to 32. A Scalar Switch-to-Switch destination port maintains a counter where the hop credits are set to 3.

Figure 7:
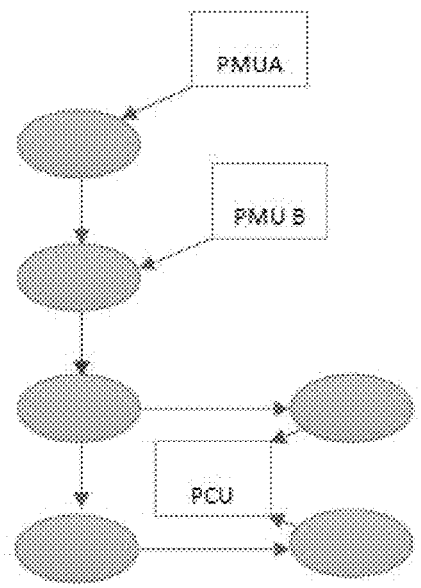
FIG. 7 shows an example of routing two operands in an ALN to a single PCU where there may be contention for a single link in the ALN.

FIG. 7 shows an example of routing two vector operands in an ALN to a single PCU where there may be contention for a single link in the ALN. Note that only some of the switches in the tile are shown in FIG. 7. The PCU executes a 2-operand vector instruction where operands A are sourced by PMU A and operands B are sourced by PMU B. Since these transmissions share a hop (colored in red), the PCU backpressures the transmission from PMU B if its operand FIFO for operand A is full. This situation can lead to a deadlock as the PCU is unable to make forward progress due to the unavailability of operand B. To remedy this deadlock, the ALN provides independent flow control for the transmissions of operands A and operands B.

For communication using either the VC_A class or the VC_B class, per-hop flow control is enforced. The producer of a packet has to ensure that the current hop's destination has space in its interface FIFO to accept the producer's packet. The back-pressure can be handled via a credit mechanism on the ALN. For instance, each input FIFO can have a hop-to-hop credit, so if a PCU's input FIFO fills up, then no switch in the ALN trying to send configuration data to that PCU's input FIFO can send data until the input FIFO empties one entry and returns a credit to the sending switch. Eventually, the back-pressure may stall the AGCU from sending data as links are busied. But, once the configurable unit consumes all 128 bits of a chunk, it empties one input FIFO entry, a credit is released, and then the sender can send a new chunk if available.

Communication using the VC_B class are end-to-end flow controlled. This is implemented using either a fine-grained credit exchange between producer and consumer or through a coarse-grained mechanism involving the release of tokens from the consumer to the producer. Both these mechanisms are explained below.

Consider a communication from X to Y using a fine-grained credit exchange. The output interface of X is initialized with as many credits as exposed by the input interface of Y. X decrements its credits with every transmission and increments its credits on receiving an acknowledgement (or credit return) from Y. X is allowed to send a transmission only if its credit count is non-zero.

Now, consider a communication from X to Y using a coarse-grained mechanism. For this, the destination Y is typically a PMU scratchpad that is configured as an N-buffer (i.e. a FIFO with N-entries). At the start of the program, Y releases N tokens to the producer X. These tokens allow X to perform up to N coarse-grained transmissions from "start" to "done". When a buffer is consumed from Y, it releases a token to X. X is not allowed to start a transmission unless it has a non-zero number of tokens.

Note that all scalar transmissions on the scalar network are end-to-end flow controlled using the fine-grained credit exchange mechanism explained above. No end-to-end credit exchange is required for control transmissions that are overloaded on this network. Every destination is required to handle a control message per cycle on each of its scalar interfaces without applying network back-pressure.

Figure 8:
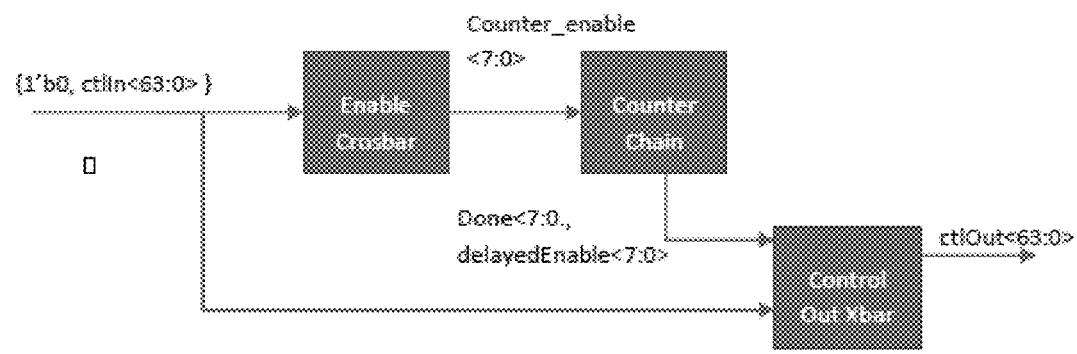
FIG. 8 shows a block diagram of a portion of the control block of a switch.

FIG. 8 shows a block diagram of a portion of the control block of a switch. The switch implements a set of 8 counters that can be used to implement the outer loops of a parallel program if the number of nested levels in the program exceeds the counters available in the PCU and/or PMU. These counters count up with a configured stride and roll over to 0 when they reach a maximum threshold configured by the compiler.

There is no path to set the counter max or stride values using a program generated value that appears on the scalar interface. These values are either statically configured in the bitfile or can appear as runtime arguments during argument load.

The switch receives 64 single-bit control inputs from 8 interfaces. These control inputs can be configured to be internally consumed as counter enables or forwarded as control outputs. The switch implements two crossbars, an EnableXbar selects 8 counter enables from among all control inputs. The CtlXbar selects 64 outputs from among the 64 control inputs, 8 "counter done" and 8 "delayed enable" pulses.

The switch configuration bitfile consists of different structures whose fields are summarized here. Each source port contains a scalar and a vector flow table. These are configured using the vec_flowtable_a and scalar_flowtable fields.

A switch destination port contains hop credits for its vector or scalar interface. The vector interface at any time can represent a VC_A or a VC_B packet. The hopCreditLimit field identifies the number of credits on each interface hop. This field need not be a compiler defined field. It can be made as part of the default configuration of the switch.

The ctlMuxSel field is used to select a control output from one of zero, 64 control inputs, and the 16 outputs (8 enable and 8 done) generated by the counter logic. The EnableMuxSel field is used to select a counter enable from one of 64 control inputs or the value zero.

The counters in the switch can be configured to count up with a stride until a maximum value. These are setup using the counter_stride_value and counter_max_value fields. A counter can be chained with the upper counter by enabling the Counterchain_chain field.

Network Use Examples

The execution of inference and training models in a highly parallel fashion leads to many interesting cases of data communication between memory and compute elements in a tile. Examples of these communication patterns are described in this section and a description how it may be handled in the ALN of the tile is provided.

The communication to a PMU may performed using the VC_B virtual channel. However, no end-to-end credit exchange is required for this communication. The PMU scratchpad is configured as an N-buffer. Up down counters in the producer are used to prevent an overflow condition in the PMU N-buffer. When a buffer is consumed, the PMU releases a token that increments the relevant up-down counter/s in the producer. This coarse-grained credit release is done using the control network that is circuit switched.

An example of many-to-one communication is a matrix multiplication of a matrix W with 1536 rows and k columns that multiplied with a matrix X with k rows and 1 column. This GEMM is parallelized across 48 PCUs and each of them writes a vector result into a single PMU. Since the results are concurrently written, the PMU needs some additional information to write them into the appropriate location. This is an example of many to one communication.

In this case, the compiler is expected to assign a source number from 0-47 to the 48 source PCUs. A PCU generates a sequence number for each vector that it produces. While driving this vector on its output port, it combines its source number and the vector's sequence number into a sequence ID. This sequence ID can be used by the destination PMU to write into the appropriate location in the scratchpad. In this example matrix X is transmitted to all 48 PCUs. This is an example of a multicast. A multicast can be setup by the compiler using the flow tables provided in each switch source port.

While a multicast can be performed on VC_A or on VC_B, this example requires a VC_B multicast to avoid deadlock. an algorithm that can be used by the compiler to enable a multicast from source A to destinations B1-Bn is described below:

Use a previously unused Flow ID.
Using the above Flow ID, program the source port flow tables in all the switches in the 2-D dimension order route between A and B1
Repeat the above step for all other destinations B2-Bn A VC_A multicast only requires the compiler to setup flow based communication from the source to all destinations of the multicast group. This setup includes configuring the flow tables in the switches as described above, setting the SW Routing bit and inserting the compiler assigned flow ID in the output.

A VC_B multicast requires the compiler to setup flow-based communication from the source to all destinations of the multicast group. This setup is similar to that for a VC_A multicast. Additionally, to handle end-to-end flow control that is required for VC_B, the compiler is required to chain all the destinations using the control network. Each destination is configured to send a token to its downstream neighbor and the hardware does so only if that destination is ready to send a credit to the sender and either it is the first destination in the chain or it receives a token from its upstream neighbor.

The last destination in the chain sends its token to the sender as a credit return. Since the above process increases the latency of a single credit return, a higher credit unit (or currency) may be chosen, such as 16 or 32 to overlap the credit return latency with the consumption latency of a transmission unit. This feature may only by implemented in the PCU since all communication to the PMU may done on VC_B without an end-to-end credit exchange as described above. Each PCU implements a pair of up-down counters to a) track the credits received from the upstream neighbor and b) to track the local credit returns. When both up-down counters are non-zero, the PCU sends a credit to its downstream neighbor and decrements both counters. The bits of configuration to handle this chaining of credits are shown in table 3.

TABLE 3

| Configuration Field | Description |
| --- | --- |
| AndChainEnable | Indicates that the B-FIFO credits are returned to the original producer by chaining credits from all consumers that are part of the multicast flow. |
| AndChainStart | Identifies a PCU as being the start of the consumer chain. If 1, the PCU does not expect upstream credits. |
| ControlCreditAndChain_sel [3:0] | Identifies the Control_In that is used to receive upstream credits |
| scalarCreditAndChain_sel [1:0] | Identifies the Scalar_In that is used to receive upstream credits |

For networks involving convolution, it is possible that the entire depth of an activation volume may not fit in a single PMU. In these cases, the computation in the next layer is required to access more than one PMU sequentially. Since the next layer computation may be parallelized across multiple PCUs, we may have to multicast the contents of a set of PMUs, sequentially.

This is an extension of a VC_A or VC_B multicast. When a PMU is done multicasting its portion of the activation, it passes a done token to the next PMU sender which then does the same. The compiler must configure the flows such that every sender sends its transmission to the previous sender and uses the same path to reach all destinations in the multicast group. This is to prevent packets from different senders from reaching the destination out of order.

Switch Vector Arbitration

This document describes the vector port arbitration for an ALN switch.

The ALN vector network supports two VCs, A and B. For forward progress on this network, the primary rule to be followed by all arbitration points is that a B request cannot depend on the forward progress of an A request. If this situation occurs, it could lead to a deadlock.

To satisfy this requirement arbiters in the switch should have the ability to look past a blocked A request.

Each switch has up to 8 vector input and output ports referred to as source ports and destination ports, respectively. There are two types of source ports, switch-to-switch and agent-to-switch.

Agent-to-switch ports receive A or B packets in a time exclusive manner so the ports do not need to handle any arbitration at the source. All requests go through a single FIFO.

Switch-Switch ports could receive A and B packets at the same time. Separation between the two classes is maintained using two FIFOs-a shared GP_FIFO and a dedicated BFIFO. The 1-entry BFIFO is dedicated to B requests. The 3-entry GP_FIFO can receive A or B requests. Ordering between requests of the same class is maintained separately. A valid_a request inserts into the GP_FIFO while a valid_b request inserts into the BFIFO (Notice that the names _a and _b are overloaded here and do not tie a request down to the VC indicated by the suffix).

There are two types of destination ports, switch-to-switch and switch-to-agent.

A switch-to-agent destination port is tied to a single VC across time

A switch-switch destination port arbitrates across requests from all sources and drives them out on the valid_a and valid_b interfaces to the switch on the other side of the interface. Analogous to the requests received on the switch-switch ports, valid_a is used to drive an A or B request while valid_b is used to exclusively drive B requests. The valid_a interface has a credit limit of 3 while the valid_b interface has a credit limit of 1.

Figure 9:
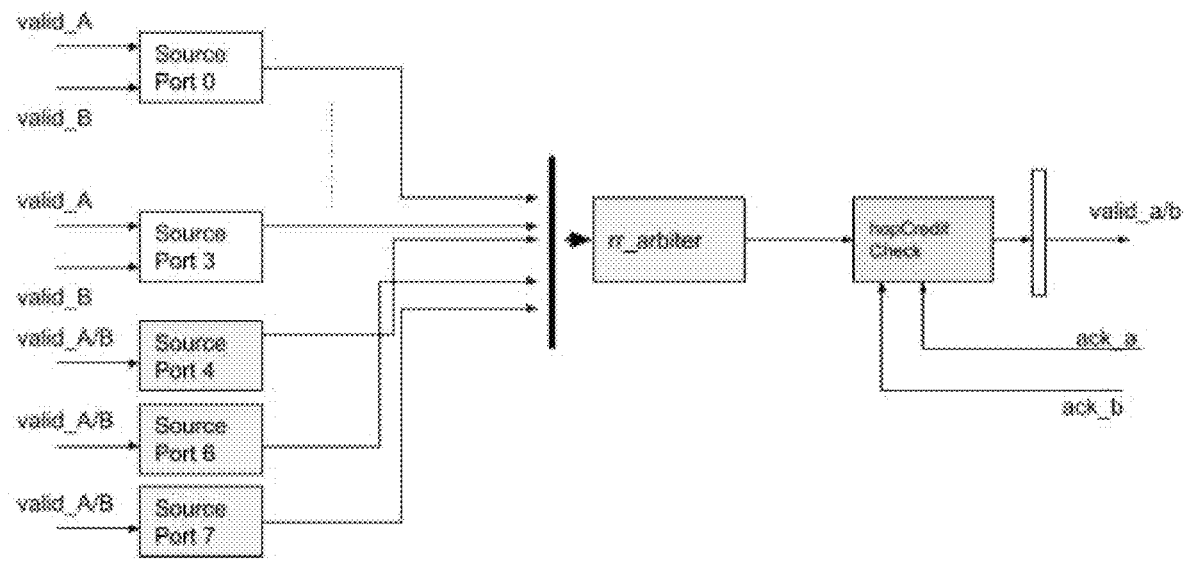
FIG. 9 shows a block diagram of an embodiment of an arbiter for vector source port requests.

FIG. 9 shows a block diagram of an embodiment of an arbiter for vector source port requests. Selection of a request is performed using two arbitration levels. The first level arbiter selects between an A and B request at the source port. At a destination port, the winner from each source goes through a round-robin selection to pick a winner. Based on the VC of the arbitration winner, the destination port looks at the A and B interface (hop credit) counters to determine if the winner can be sent.

The arbiter of FIG. 9 may have not be able to avoid starvation of some requests, however. The A/B requests into the rr_arbiter are not gated by the availability of the hop credits to the corresponding destination. This is done so as to relieve excessive timing pressure from the ack* signals that are driven out of a flip flop at the downstream destination.

The anchor of the rr_arbiter in the switch-switch destination ports is moved if there is a valid request speculating that a request will be able to issue on the interface. The arbiter cannot be stalled on an A request as this could lead to a forward progress violation.

One potential problem that the arbiter of FIG. 9 could encounter is starvation of a source port. Since there is a single arbiter for both A and B packets, it is possible for a A/B packet from a source to starve out the B/A request from the same source. For forward progress, the arbiter pointer is advanced even on an A pick that eventually fails arbitration. Due to this choice, it is possible for a source to be starved.

Another potential problem that could be displayed by the arbiter of FIG. 9 is starvation of a VC due to a harmonic. If a source requests in an A0B0A0B0 pattern, it is possible for another source requesting in a B1A1B1A1 pattern such that one of (A0,B1) or (A1,B0) always wins arbitration, starving out the other pair.

A solution for the starvation issues discussed above is split between the source port and the destination ports of the switch design.

A change to the switch destination port design introduces starvation protection at each switch-switch destination port through an additional "starvation" arbiter. Switch-to-agent ports do not require any additional support. Their round-robin arbiters are coded to advance only on a successful pick and not speculatively. Each switch-switch destport maintains two arbiters-a default, speculative arbiter and a non-speculative starvation arbiter. The precise description of requests going into the speculative and non-speculative arbiters is described below. Note that the terms starvation arbiter and non-speculative arbiter are used interchangeably and the terms speculative arbiter and default arbiter are used interchangeably.

A starvation counter may be maintained for each {VC, source port} combination. This counter may increment under two conditions:
  If a request with a VC and source-port loses arbitration to another request of the same VC. For this case, the counter is not incremented if the corresponding interface is full.
  If a request from a VC,source-port has its "starved" bit set (see later) the starvation counter saturates at a threshold value that is configurable. Threshold values of 31, 16, 24 and 8 are allowed. When a counter reaches its threshold value, it asserts a "starved" wire corresponding to the {VC, source port} tuple. The starvation counter is cleared if the corresponding {VC, source port} request wins arbitration.

A starvation counter may be maintained in every switch-to-switch destination port. A starvation counter is reset if the corresponding {VC, source port} request wins arbitration. If any one of the starvation counters is non-zero, the destination port is said to be in a "starvation phase" or a "starved" state. When in this state, the speculative arbiter is ignored.

The non-speculative arbiter accepts the OR of the following requests:
  If there is at least one starved request, the following requests are considered:
    Starved A requests qualified with a non-full interface [0].
    Starved B requests qualified with a non-full interface [1] or if interface [0] is less than 2 (3 being the credit limit on this interface).
    New (not starved) B requests if there are no starved B requests qualified a full interface [0] and a non-full interface [1]. New B requests are allowed to participate in arbitration only under this specific condition. This is done because the starved VC_A requests may be dependent on their progress.
  If there is no starved request, the following requests are considered:
    A requests qualified with a non-full interface [0]
    B requests qualified with a non-full interface [1] or if interface [0] is less than 2

Note that the non-speculative arbiter takes an extra cycle to look at acks coming back on the interface. This is done because the "full" qualifications are done at the input into the arbiter and not at the output.

The anchor of the non-speculative arbiter is moved under the following conditions:
  During starvation if a starved request wins arbitration
  When not in starvation if any request wins arbitration The default arbiter accepts all requests (without regard to interface availability) and performs round robin arbitration across them. A request from this arbiter is selected if there is no valid request into the non-speculative arbiter. The anchor of the default arbiter is moved if a pick from this arbiter is able to issue on the interface.

Figure 10:
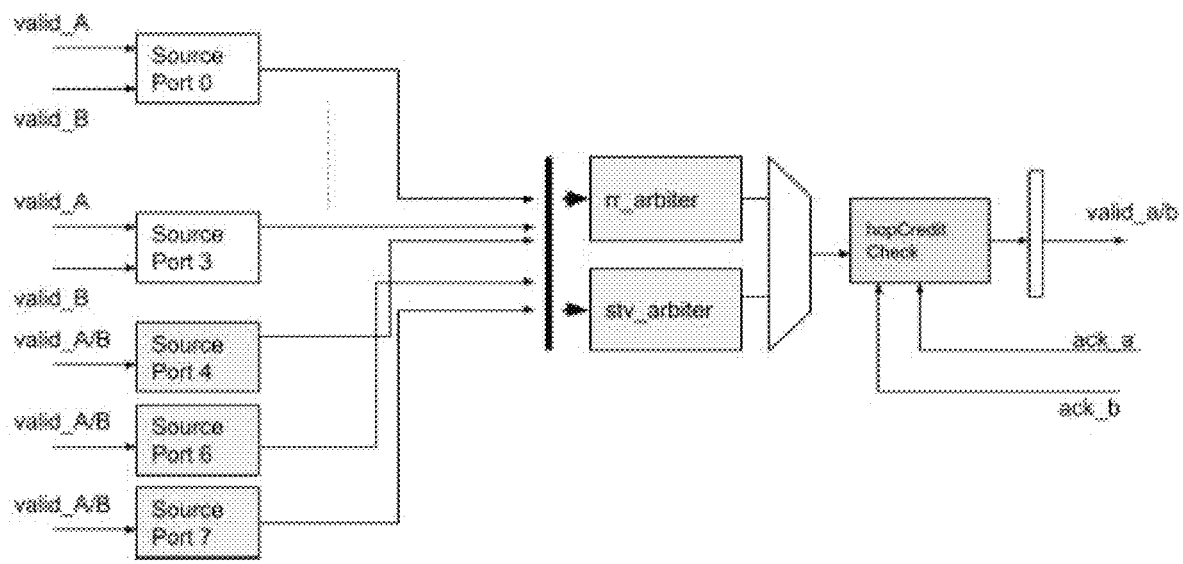
FIG. 10 shows a block diagram of an alternative embodiment of an arbiter for vector source port requests.

The description above pertains to the destination port. However it is possible for a request from a source to always appear at the destination when the destination interface is full. To register these requests in the destination port's starvation counters, there is logic at each source port to mark a request as starved at a configurable frequency. For example, if a request is configured with a source starvation threshold of 4, then every 4th unsuccessful request from that source, VC combination is marked as "starved". If the destination receives a "starved" request from a {source, VC}, it increments the corresponding starvation counter unless that request wins arbitration. This is shown in the block diagram of an embodiment of a switch arbiter in FIG. 10.

Yet another embodiment of a switch arbiter removes the need for speculation by providing fully sized source port FIFOs that can absorb the skid between making an arbitration decision to receiving an acknowledgement from the destination switch's source port FIFO. However, starvation of a request can still occur with this design so a starvation prevention mechanism is provided.

Figure 11:
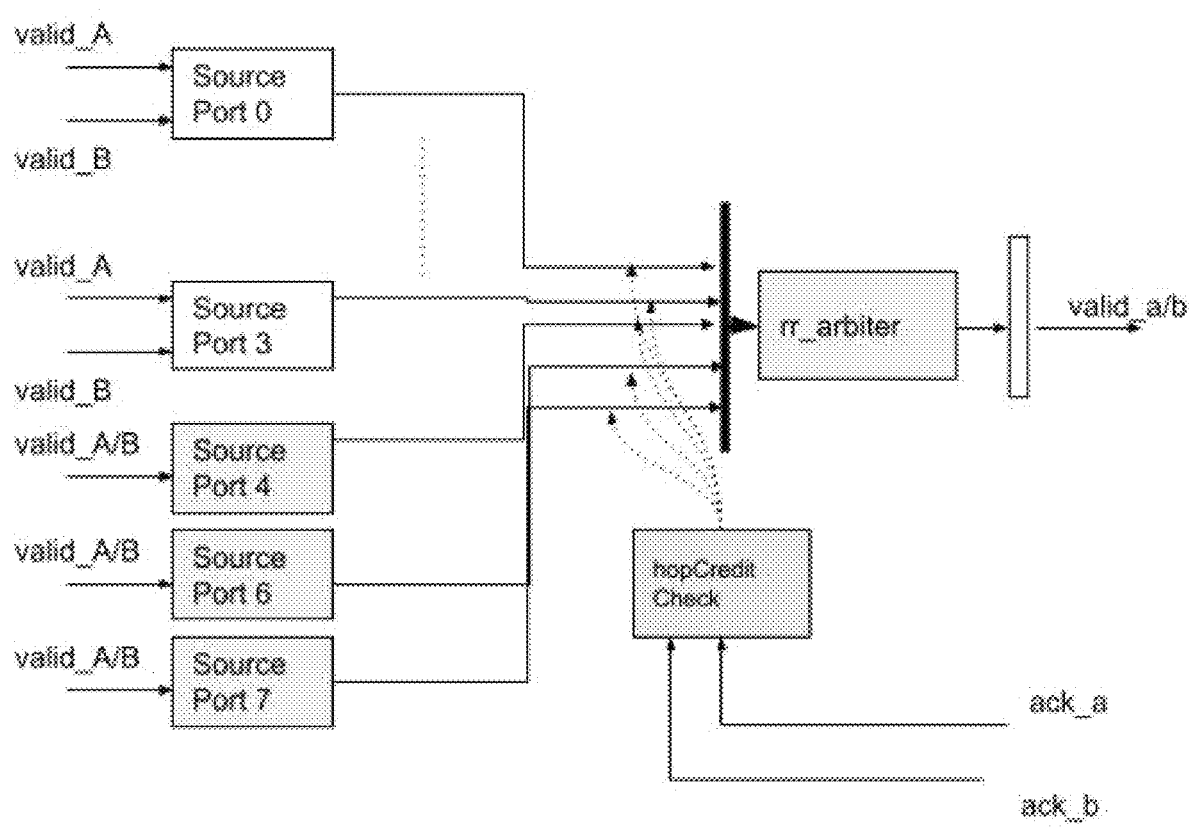
FIG. 11 shows a block diagram of another embodiment of an arbiter for vector source port requests.

FIG. 11 shows a block diagram of another embodiment of an arbiter for vector source port requests. The embodiment shown in FIG. 11 shows how a hop credit check influences the valids going into the rr_arbiter i.e. an A or B request is allowed to arbitrate only if there are corresponding downstream credits for that request to be driven out.

It is possible for a request from a source to continuously be out of step with what is selected at the destination. For example, a source port may alternate between an A and a B request but one of those could always lose arbitration at the destination. The anchor of the rr_arbiter in this case will still move as long as the other request from the same source wins arbitration.

To prevent this, the starvation counters discussed above may be preserved. Additionally, the anchor of the rr_arbiter on a valid selection may be moved except if the request in the anchor location is starved and is not the arbitration winner.

Some non-limiting examples are provided below:
  If the request winning arbitration is from source X and the anchor is pointing to source Y, move the anchor if is_starved_a [Y] and is_starved_b [Y] are both zero.
  If a VC_A request wins arbitration from source X and the anchor is pointing to source X, then move the anchor if is_starved_b [Y] is zero.
  As a corollary of the above case, if a VC_B request wins arbitration from source X, and the anchor is pointing to source X, then move the anchor if is_starved_a [Y] is zero.

Figure 12:
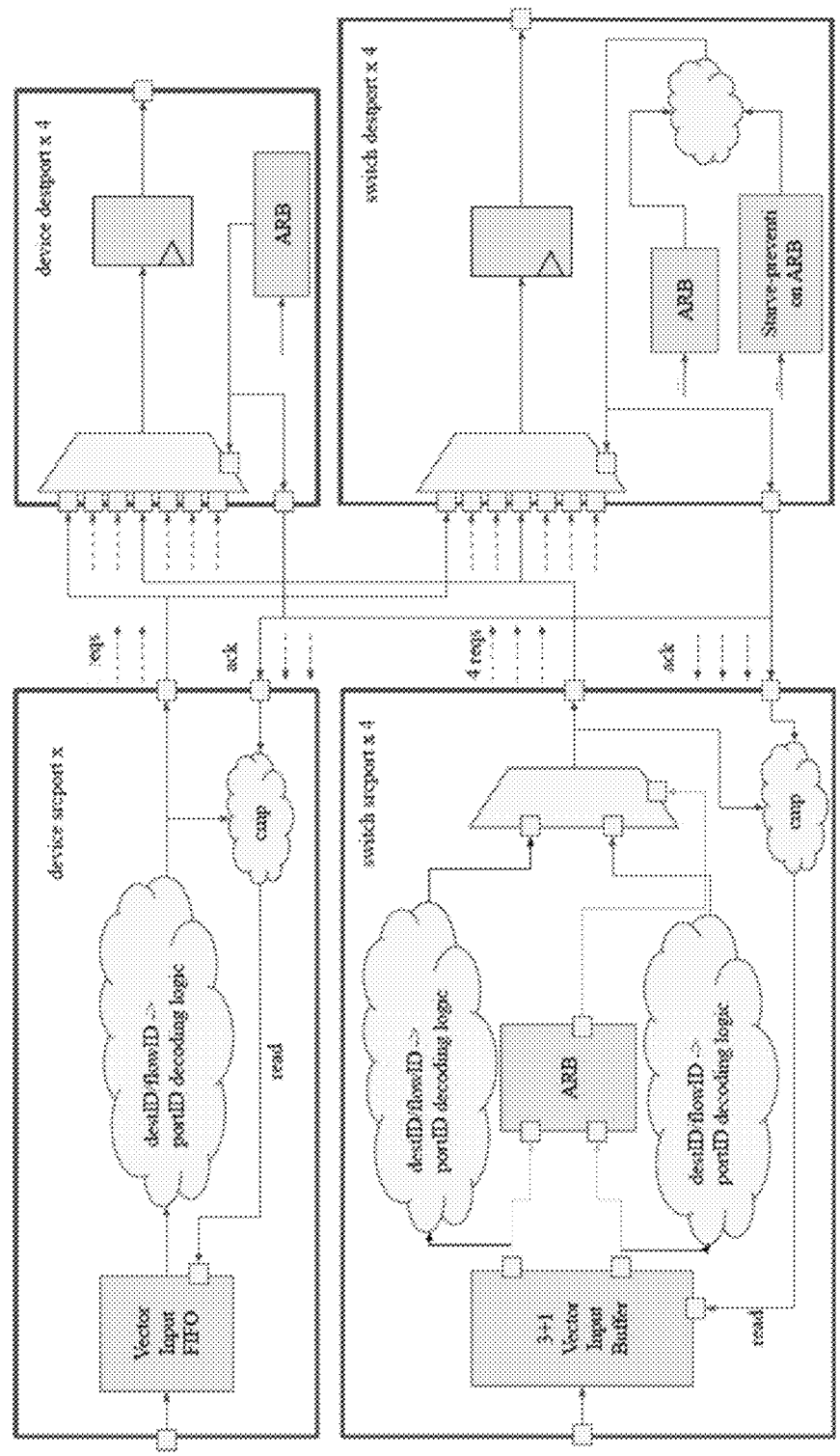
FIG. 12 shows a block diagram of yet another embodiment of an arbiter for vector source port requests.

FIG. 12 shows a block diagram of yet another embodiment of an arbiter for vector source port requests. It shows additional detail of arbitration at both the source ports and destination ports.

Example Implementation: A switch for a network on an integrated circuitry (IC), the switch comprising: a plurality of network ports, each network port of the plurality of network ports including a vector port, a scalar port, and a control port; a first subset of the plurality of network ports respectively connected to other switches on the IC; a second subset of the plurality of network ports respectively connected to agents on the IC, the agents of the IC comprising an address generation unit, a memory, and/or a compute unit; a first request line, a first acknowledge line, a second request line, and a second acknowledge line each associated with a source portion of a first vector port of the first subset of the plurality of network ports; a FIFO having a first depth with an input coupled to the source portion of the first vector port; a register coupled to the source portion of the first vector port; and circuitry coupled to the first request line, the second request line, the FIFO, and the register, the circuitry configured to: receive a first request on the first request line, determine whether the FIFO is full, and in response to determining that the FIFO is not full, controlling the FIFO to add data from the first vector port to FIFO, and send an acknowledgement on the first acknowledge line that data has been accepted; receive a second request on the second request line, store the data from the first vector port to the register, and send an acknowledgement on the second acknowledge line that data has been accepted.

We claim as follows:

1. A reconfigurable dataflow processor comprising:
an array of configurable units; and
a plurality of switches configured to form a mesh network coupled to configurable units of the array of configurable units, a switch of the plurality of switches including, a flow table, an input port having a data section, a routing bit, and a destination field, and two or more output ports;
a configurable unit of the array of configurable units comprising:
  a data port coupled to the input port of the switch, the data port including a data section, a routing bit, and a destination field;
  a table having three or more entries, an output of the table coupled to the destination field of the data port; and
  a dynamic destination ID field, coupled to an address input of the table and to an arithmetic logic unit (ALU) of the configurable unit;
wherein the switch is configured to:
  receive first data, a first routing value, and first destination information through the data section, the routing bit, and the destination field, respectively, of the input port from the configurable unit, wherein the first destination information includes a row number and a column number for a destination of the first data;
  route the first data to a first output port of the two or more output ports selected based on the first destination information in response to receiving the first routing value associated with the first data; and
  receive second data, a second routing value that is different than the first routing value, and second destination information, retrieved using the dynamic destination ID field from the table of the configurable unit, through the data section, the routing bit, and the destination field, respectively, of the input port from the configurable unit; and
  route the second data to a second output port of the two or more output ports selected based on information retrieved from the flow table using the second destination information in response to receiving the second routing value associated with the second data.

2. The reconfigurable dataflow processor of claim 1, the configurable unit further comprising:
a selector coupled between the ALU and the dynamic destination ID field and further coupled to an output context bitfield of provided by configuration bits of a unit file stored in the configurable unit, the selector configured to select either data from the ALU or the output context bitfield as the dynamic destination ID field.

3. The reconfigurable dataflow processor of claim 1, wherein the ALU is programmable to dynamically calculate the dynamic destination ID field.

4. The reconfigurable dataflow processor of claim 1, wherein the input port of the switch and the data port of the configurable unit both also include a sequence ID field, separate and distinct from the destination field, to provide a source ID and a sequence number from the configurable unit to the switch.

5. The reconfigurable dataflow processor of claim 1, further comprising a configuration store in the configurable unit, wherein the configuration store stores third destination information; and
the switch is further configured to:
  receive third data, the second routing value, and the third destination information through the data section, the routing bit, and the destination field, respectively, of the input port from the configurable unit; and
  route the third data to a third output port of the two or more output ports selected based on third information retrieved from the flow table using the third destination information in response to receiving the second routing value associated with the third data.

6. The reconfigurable dataflow processor of claim 1, further comprising a configuration store in the configurable unit, wherein the configuration store stores the first destination information.

7. A reconfigurable dataflow processor comprising:
an array of configurable units; and
a plurality of switches configured to form a mesh network coupled to configurable units of the array of configurable units, a switch of the plurality of switches including a flow table, two or more output ports, and an input port that includes a data section, a routing bit, and a destination field;
wherein a configurable unit of the array of configurable units is configured to dynamically calculate second destination information; and
the switch is configured to:
  receive first data, a first routing value, and first destination information through the data section, the routing bit, and the destination field, respectively, of the input port from the configurable unit, wherein the first destination information includes a row number and a column number for a destination of the first data;
  route the first data to a first output port of the two or more output ports selected based on the first destination information in response to receiving the first routing value associated with the first data;
  receive second data, a second routing value that is different than the first routing value, and the second destination information through the data section, the routing bit, and the destination field, respectively, of the input port from the configurable unit; and route the second data to a second output port of the two or more output ports selected based on information retrieved from the flow table using the second destination information in response to receiving the second routing value associated with the second data.

8. The reconfigurable dataflow processor of claim 7, further comprising a configuration store in the configurable unit, wherein the configuration store stores third destination information; and the switch is further configured to:

receive third data, the second routing value, and the third destination information through the data section, the routing bit, and the destination field, respectively, of the input port from the configurable unit; and route the third data to a third output port of the two or more output ports selected based on third information retrieved from the flow table using the third destination information in response to receiving the second routing value associated with the third data.

9. The reconfigurable dataflow processor of claim 7, further comprising a configuration store in the configurable unit, wherein the configuration store stores the first destination information.

10. The reconfigurable dataflow processor of claim 7, wherein the input port of the switch also includes a sequence ID field, separate and distinct from the destination field, to provide a source ID and a sequence number to the switch from the configurable unit.

11. The reconfigurable dataflow processor of claim 7, the configurable unit further comprising:

an ALU to dynamically calculate a dynamic destination ID field; and a selector coupled between the ALU and the dynamic destination ID field and further coupled to an output context bitfield of provided by configuration bits of a unit file stored in the configurable unit, the selector configured to select either data from the ALU or the output context bitfield as the dynamic destination ID field.

12. The reconfigurable dataflow processor of claim 11, wherein the ALU is programmable to dynamically calculate the dynamic destination ID field.

13. A method of routing data through a plurality of switches configured to form a mesh network, a switch of the plurality of switches including a flow table, two or more output ports, and an input port, connected to a configurable unit in an array of configurable units, that includes a data section, a routing bit, and a destination field, the method comprising:

sending, from the configurable unit to the switch, first data, a first routing value, and first destination information through the data section, the routing bit, and the destination field, respectively, of the input port at the switch from the configurable unit, wherein the first destination information includes a row number and a column number for a destination of the first data;

routing, by the switch, the first data to a first output port of the two or more output ports selected based on the first destination information in response to receiving the first routing value associated with the first data;

dynamically calculating, by the configurable unit, second destination information;

receiving, at the switch, second data, a second routing value that is different than the first routing value, and the second destination information through the data section, the routing bit, and the destination field, respectively, of the input port from the configurable unit;

retrieving, by the switch, routing information from the flow table using the second destination information in response to receiving the second routing value associated with the second data; and routing, by the switch, the second data to a second output port of the two or more output ports selected based on the routing information.

14. The method of claim 13, further comprising:

retrieving, from a configuration store in the configurable unit, third destination information;

receiving, at the switch, third data, the second routing value, and the third destination information through the data section, the routing bit, and the destination field, respectively, of the input port from the configurable unit;

retrieving, by the switch, third routing information from the flow table using the third destination information in response to receiving the second routing value associated with the third data; and routing, by the switch, the third data to a third output port of the two or more output ports selected based on the third routing information.

15. The method of claim 13, further comprising:

retrieving, from a configuration store in the configurable unit, the first destination information.

16. The method of claim 13, wherein the input port of the switch also includes a sequence ID field, separate and distinct from the destination field, the method further comprising providing a source ID and a sequence number from the configurable unit to the switch with the first data.

17. The method of claim 13, dynamically calculating the second destination information comprising:

dynamically calculating a dynamic destination ID field using an ALU of the configurable unit; and retrieving the second destination information from a table having three or more entries in the configurable unit using the dynamic destination ID field as an index into the table.

18. The method of claim 17, dynamically calculating, the second destination information further comprising:

selecting the dynamic destination ID field to use as the index into the table from between an output of the ALU and an output context bitfield provided by configuration bits of a unit file stored in the configurable unit.

* * * * *